(12) United States Patent
Wang et al.

(10) Patent No.: US 11,449,900 B2
(45) Date of Patent: Sep. 20, 2022

(54) INFORMATION PROCESSING METHOD, SERVER, TERMINAL, AND COMPUTER STORAGE MEDIUM

(71) Applicant: TENCENT TECHNOLOGY (SHENZHEN) COMPANY LIMITED, Shenzhen (CN)

(72) Inventors: Qian Wang, Shenzhen (CN); Bingfeng Dong, Shenzhen (CN); Lingling Yao, Shenzhen (CN); Junliang Chen, Shenzhen (CN); Xinming Luo, Shenzhen (CN); Yuan Wang, Shenzhen (CN); Lieqiang Li, Shenzhen (CN); Jianxun Zhou, Shenzhen (CN); Bing Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 367 days.

(21) Appl. No.: 15/937,578

(22) Filed: Mar. 27, 2018

(65) Prior Publication Data

US 2018/0218408 A1  Aug. 2, 2018

Related U.S. Application Data

(63) Continuation of application No. PCT/CN2017/070680, filed on Jan. 9, 2017.

(30) Foreign Application Priority Data

Jan. 8, 2016 (CN) .......................... 201610014137.1

(51) Int. Cl.
*G06Q 30/02* (2012.01)
*G06F 16/9535* (2019.01)
(Continued)

(52) U.S. Cl.
CPC ......... *G06Q 30/0269* (2013.01); *G06F 16/00* (2019.01); *G06F 16/9535* (2019.01); *G06Q 50/01* (2013.01); *G06Q 30/0643* (2013.01)

(58) Field of Classification Search
CPC ............... G06Q 30/0269; G06Q 50/01; G06Q 30/0643; G06F 16/00; G06F 16/9535
See application file for complete search history.

(56) References Cited

U.S. PATENT DOCUMENTS

| 2008/0276180 | A1* | 11/2008 | Zacarias | ................. | G06Q 30/02 |
| | | | | | 715/739 |
| 2009/0006398 | A1* | 1/2009 | Lam | ....................... | G06Q 30/02 |

(Continued)

FOREIGN PATENT DOCUMENTS

| CN | 102130933 A | 7/2011 |
| CN | 103049440 A | 4/2013 |

(Continued)

OTHER PUBLICATIONS

The State Intellectual Property Office of the People's Republic of China (SIPO) Office Action 1 for 201610014137.1 dated Oct. 9, 2019 11 Pages (including translation).
The World Intellectual Property Organization (WIPO) International Search Report for PCT/CN2017/070680 dated Apr. 5, 2017 6 Pages (including translation).

*Primary Examiner* — John Van Bramer
(74) *Attorney, Agent, or Firm* — Anova Law Group, PLLC

(57) ABSTRACT

The present disclosure provides an information processing method, a server, a terminal, and a computer storage medium. The method includes: obtaining first information from a terminal, the first information comprising at least a media object on which an operation is performed and a user identifier; obtaining second information associated with the media object on which the operation is performed, the second information comprising more than one piece of media information; obtaining third information according to (Continued)

the user identifier, the third information comprising at least basic user information, user behavior information, and user relationship chain information; obtaining fourth information associated with the third information, the fourth information comprising more than one piece of media information; and sending the second information and the fourth information to the terminal, so that the terminal aggregates and displays the media information in the second information and the fourth information.

20 Claims, 17 Drawing Sheets

(51) Int. Cl.
*G06F 16/00* (2019.01)
*G06Q 50/00* (2012.01)
*G06Q 30/06* (2012.01)

(56) References Cited

U.S. PATENT DOCUMENTS

2014/0365944 A1* 12/2014 Moore ............... G01C 21/3438
715/772
2016/0378757 A1* 12/2016 Bahl ...................... G06Q 50/01
707/728
2017/0148064 A1* 5/2017 Hall ................... G06Q 30/0267

FOREIGN PATENT DOCUMENTS

| CN | 103064863 A | | 4/2013 | |
|---|---|---|---|---|
| CN | 103309866 | * | 9/2013 | ............ G06F 17/30 |
| CN | 103309866 A | | 9/2013 | |
| CN | 103440259 A | | 12/2013 | |
| CN | 103455587 A | | 12/2013 | |
| CN | 105528459 A | | 4/2016 | |
| WO | 2007105909 A1 | | 9/2007 | |

* cited by examiner

INFORMATION PROCESSING METHOD, SERVER, TERMINAL, AND COMPUTER STORAGE MEDIUM

CROSS-REFERENCES TO RELATED APPLICATIONS

This application is a continuation application of PCT Patent Application No. PCT/CN2017/070680, filed on Jan. 9, 2017, which claims priority to Chinese Patent Application No. 201610014137.1, entitled "INFORMATION PROCESSING METHOD, SERVER, TERMINAL, AND COMPUTER STORAGE MEDIUM" filed on Jan. 8, 2016, all of which are incorporated by reference in entirety

FIELD OF THE TECHNOLOGY

The present disclosure relates to communications technologies and, in particular, to an information processing method, a server, a terminal, and a computer storage medium.

BACKGROUND OF THE DISCLOSURE

Currently, information recommendation is widely applied to the Internet field. When information recommendation is performed by using Internet media, recommended information content is often monotonous, for example, only a piece of information related to a particular keyword is recommended, and information that can be selected by users is limited.

In addition, the recommended information content is often not information content needed by the users because individualities of the users, such as ages, genders, interests, social interactions of the users are often not considered. That is, the information recommendation is not accurate. An effective solution to this problem is desired.

SUMMARY

In view of this, embodiments of the present disclosure are intended to provide an information processing method, a server, a terminal, and a computer storage medium, to resolve at least certain problems in the existing technology, and provide instant, diverse, and personalized information recommendation to a user, thereby providing accurate aggregated information to the user.

One aspect of the present disclosure includes an information processing method. The method includes: obtaining first information from a terminal, the first information comprising at least a media object on which an operation is performed and a user identifier; obtaining second information associated with the media object on which the operation is performed, the second information comprising more than one piece of media information; obtaining third information according to the user identifier, the third information comprising at least basic user information, user behavior information, and user relationship chain information; obtaining fourth information associated with the third information, the fourth information comprising more than one piece of media information; and sending the second information and the fourth information to the terminal, so that the terminal aggregates and displays the media information in the second information and the fourth information.

Another aspect of the present disclosure includes an information processing server. The server includes a memory storing instructions; and a processor coupled to the memory. When executing the instructions, the processor is configured for: obtaining first information from a terminal, the first information comprising at least a media object on which an operation is performed and a user identifier; obtaining second information associated with the media object on which the operation is performed, the second information comprising more than one piece of media information; obtaining third information according to the user identifier, the third information comprising at least basic user information, user behavior information, and user relationship chain information; obtaining fourth information associated with the third information, the fourth information comprising more than one piece of media information; and sending the second information and the fourth information to the terminal, so that the terminal aggregates and displays the media information in the second information and the fourth information.

Another aspect of the present disclosure includes a non-transitory computer-readable storage medium containing computer-executable instructions for, when executed by one or more processors, performing an information processing method. The method includes: obtaining first information from a terminal, the first information comprising at least a media object on which an operation is performed and a user identifier; obtaining second information associated with the media object on which the operation is performed, the second information comprising more than one piece of media information; obtaining third information according to the user identifier, the third information comprising at least basic user information, user behavior information, and user relationship chain information; obtaining fourth information associated with the third information, the fourth information comprising more than one piece of media information; and sending the second information and the fourth information to the terminal, so that the terminal aggregates and displays the media information in the second information and the fourth information.

Other aspects of the present disclosure can be understood by those skilled in the art in light of the description, the claims, and the drawings of the present disclosure.

DESCRIPTION OF EMBODIMENTS

The following are descriptions and explanations of related terms in the embodiments of the present disclosure.

Figure 1:
FIG. 1 is a first schematic diagram of an aggregation and display scenario.

Aggregation-page advertising: as shown in FIG. 1, an innovative advertising form in which a newly added traffic page is introduced by an ordinary position advertisement traffic, and the new traffic page aggregates and displays multiple advertisements, and uses technical means or skills to optimize the click value rate (CVR) effect of an advertiser and to improve the advertising platform revenue.

Social graph: A graph established by using social relationships between persons as a clue, where analysis is performed by using a "person" in an online or offline social scenario as a minimum unit to construct a network graph of bidirectional relationships between friends in a social network.

Interest graph: A graph established by using a common interest between persons as a clue, where group data is clicked according to an advertisement, and an audience interest is analyzed by using an "interest point" as a minimum unit to construct a network graph between groups having similar and related audience interests.

Social interest graph: A product of the social graph and the interest graph after being mutually distilled, developed, and symbiosed.

Figure 2:
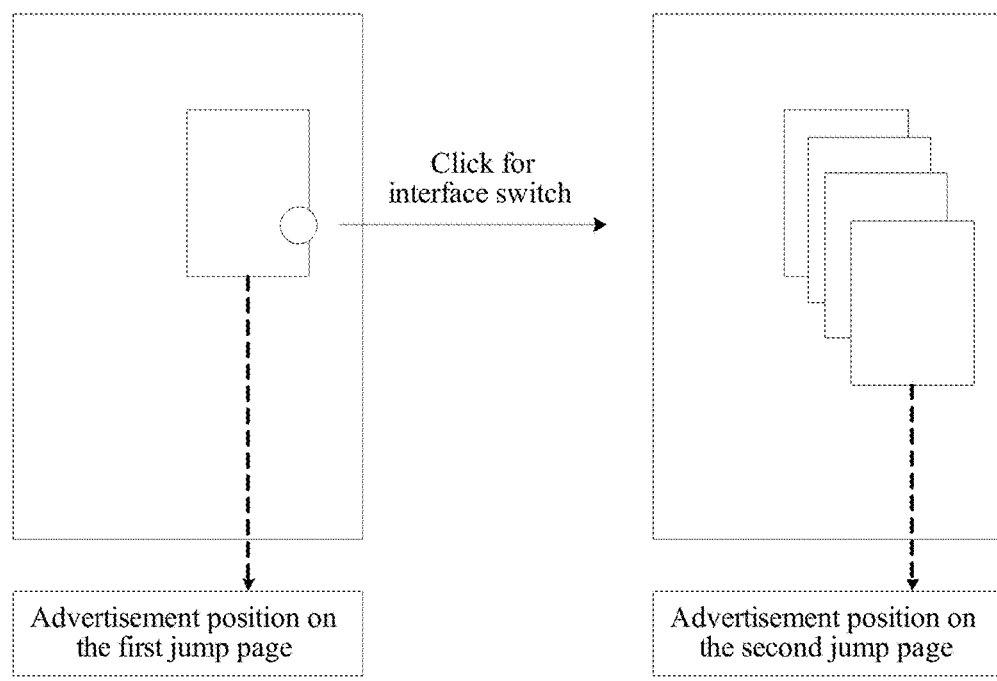
FIG. 2 is a schematic diagram of a first-jump page and a second-jump page.

First-jump page: Referring to FIG. 2, includes an ordinary advertisement position of a traffic side introduced by an advertising platform.

Second-jump page: Referring to FIG. 2, includes multiple aggregated advertisement positions displayed on a newly added second-jump aggregation page.

The following further describes implementation of the technical solutions in detail with reference to the accompanying drawings.

Figure 3:
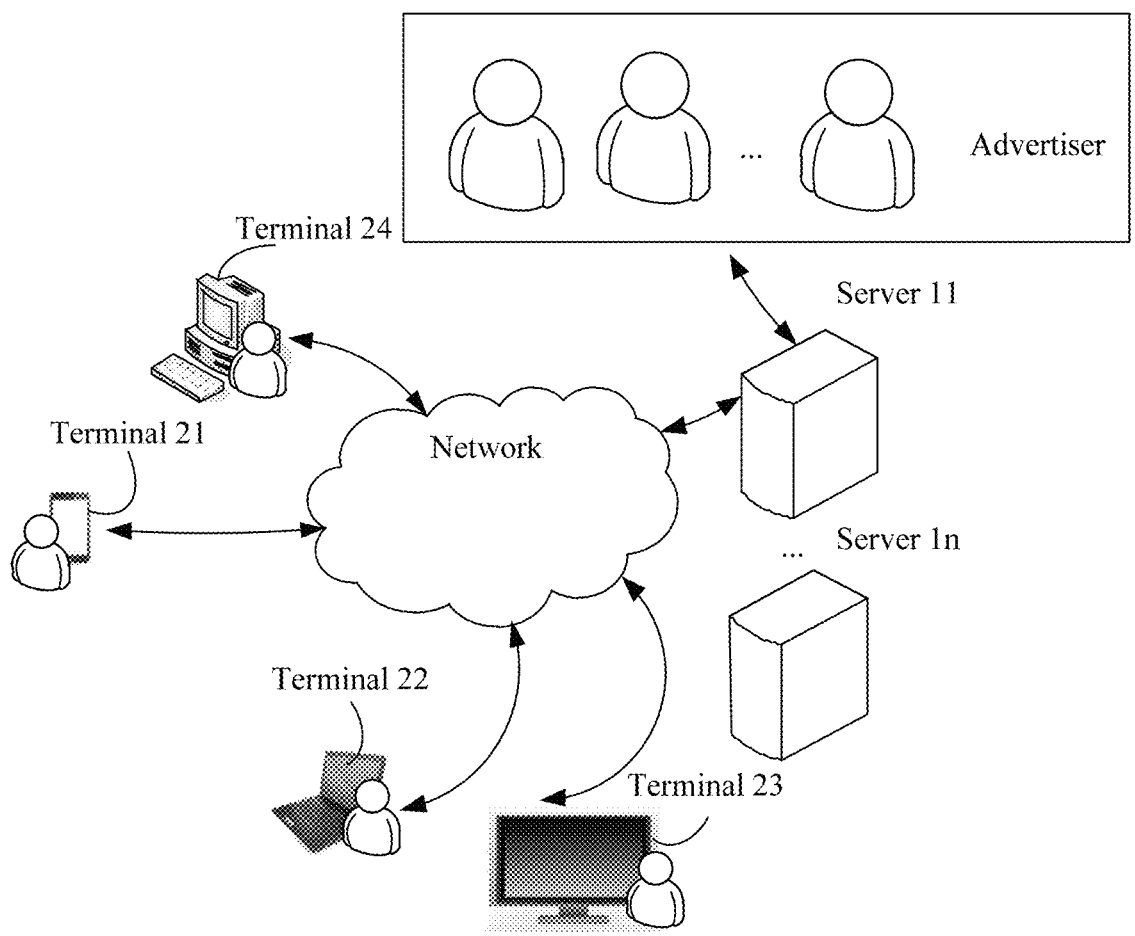
FIG. 3 is a schematic diagram of hardware entities performing information exchange according to an embodiment of the present disclosure.

FIG. 3 is a schematic diagram of hardware entities performing information exchange according to an embodiment of the present disclosure. FIG. 3 includes servers 11 to 1n and terminals 21 to 24. The terminals 21 to 24 exchange information with the servers by using a wired network or a wireless network. The terminal includes types such as a mobile phone, a tablet computer, a PC, and an all-in-one machine. In an example, the servers 11 to 1n may further interact with a terminal of an advertiser (or referred to as an object providing an advertisement material or content promotion) by using a network. After the advertiser submits a to-be-placed advertisement, the advertisement is stored in a server cluster. An administrator may be staffed to perform a series of processing such as auditing the advertisement placed by the advertiser. The terminals 21 to 24 are terminals of ordinary users (or referred to as objects to which an advertisement is to be displayed or exposed). An advertisement may be added to all applications or specified applications (such as a gaming application, a video application, and a navigation application) installed in the terminal, to display more recommended information to the users. According to the embodiments of the present disclosure, based on the system shown in FIG. 3, first information is obtained from a terminal, the first information including at least a media object on which an operation is performed and a user identifier; second information associated with the media object on which the operation is performed is obtained, the second information including more than one piece of media information; third information is obtained according to the user identifier, the third information including at least basic user information, user behavior information, and/or user relationship chain information; fourth information associated with the third information is obtained, the fourth information including more than one piece of media information; and the second information and the fourth information are sent to the terminal, so that the terminal aggregates and displays the media information. Because the second information provided to the terminal for aggregation and display is associated with the media object on which the operation is performed, and the media object on which the operation is performed represents a target currently focused by the user, instant and accurate recommended information content can be provided to the user. In addition, the fourth information provided to the terminal for aggregation and display is associated with the basic user information, the user behavior information, and/or the user relationship chain information, thereby providing more diverse and personalized recommended information content to the user.

The example of FIG. 3 is only a system architecture example for implementation of the embodiments of the present disclosure. The embodiments of the present disclosure are not limited to the system architecture in FIG. 3.

Figure 4:
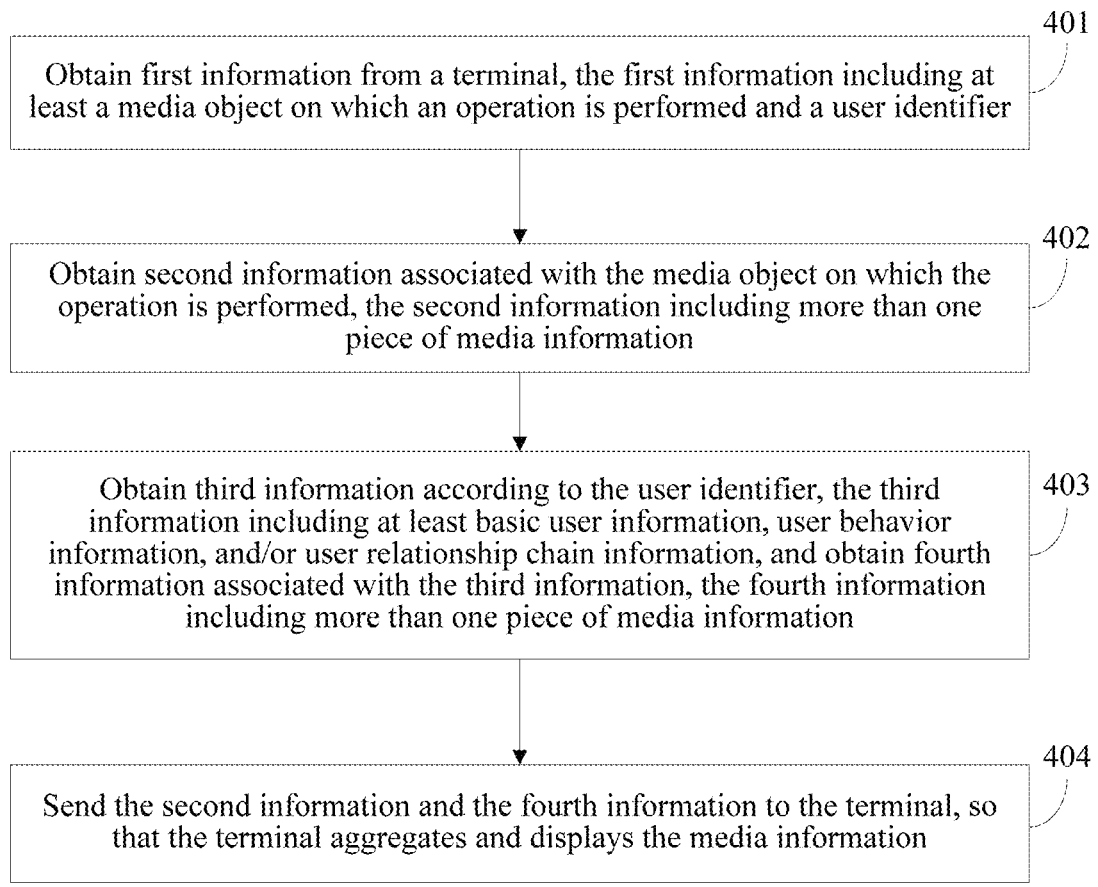
FIG. 4 is a schematic flowchart of an information processing method according to an embodiment of the present disclosure.

One embodiment provides an information processing method. As shown in FIG. 4, the method includes the followings.

401: Obtaining first information from a terminal, the first information including at least a media object on which an operation is performed and a user identifier.

Herein, the terminal is a terminal of an ordinary user (or referred to as an object to which an advertisement is to be displayed or exposed). Each user in one embodiment corresponds to one user identifier, and different users in a social network may be distinguished by using different user identifiers. For example, the user identifier may be implemented by using any combination of characters.

When a user browses a first interface on a terminal, the first interface displays more than one media object. Herein, the first interface is referred to as a first-jump page, and each media object displayed on the first-jump page occupies an ordinary display position. The media object is an interactive object that can respond to an operation. When the media object is displayed on the first-jump page, media information corresponding to the media object is displayed as specific content, and the media information is any combination of the following information: text, a picture, a video, and audio.

When the user selects one media object to perform an operation (such as a click), the terminal adds the media object on which the operation is performed and a user identifier to the first information and sends the first information to a server. In this way, the server obtains the first information from the terminal, and parses the first information to obtain the media object on which the operation is performed and the user identifier.

402: Obtaining second information associated with the media object on which the operation is performed, the second information including more than one piece of media information.

The operation performed by the user on a media object on the first-jump page explicitly indicates an instant interest of the user at that moment. Therefore, the user has a high demand for the second information associated with the media object on which the operation is performed.

In this example, the process of obtaining second information associated with the media object on which the operation is performed is specifically: determining a target keyword according to the media object on which the operation is performed, the target keyword is a keyword of the media object, for example, a specific brand of shoes, or clothes having certain characteristic. Then, the keyword and all media information consistent with the target keyword are combined and are used as the second information. The second information includes more than one piece of media information, and each piece of the media information in the second information is associated with the media object, that is, consistent with the keywords.

In this example, when the second information is displayed on the terminal, the second information is displayed on a second interface. Herein, the second interface is a second-jump page, and each piece of the media information displayed on the second-jump page occupies an aggregated display position. Because the second information includes more than one piece of media information, display of the second information is aggregated display.

In this example, because the media information displayed on the second-jump page is correlated to the media object on the first-jump page, instant and accurate recommended information content can be provided to the user.

403: Obtaining third information according to the user identifier, the third information including at least basic user information, user behavior information, and/or user relationship chain information, and obtaining fourth information associated with the third information, the fourth information including more than one piece of media information.

In this example, one user identifier uniquely determines one user. The third information of the user that can be determined according to the user identifier includes the basic user information, the user behavior information, and/or the user relationship chain information. The basic user information includes, for example, the age or the gender of the user, or the region in which the user is located. The user behavior information includes, for example, whether the user likes shopping or playing games, or whether the user is interested in content of a piece of advertisement information. The user relationship chain information includes, for example, a QQ friend chain, a Wechat friend circle, friends in QQ space, high school classmates, college classmates, or a human network.

That is, the basic user information indicates natural properties of the user, the user behavior information indicates long-term interests of the user, and the user relationship chain information indicates friends of the user in a social network and interests of the friends. Based on this, the fourth information is associated with the third information, and the fourth information displayed on the second-jump page is recommended according to the natural properties, the long-term interests, and the friends of the user in the social network, and the interests of the friends. In this way, diverse and personalized recommended information content can be provided to the user.

In one embodiment, all media information included in the second information and the fourth information is uploaded to the server by an advertiser (or referred to as an object providing an advertisement material or content promotion) by using a terminal of the advertiser. The media information, using an advertisement as an example, includes many types, for example, basic information of the advertisement such as expression elements (a spokesperson, an advertising copy, music, and the like) included in the advertisement, brand information such as information that is related to a brand and that is expressed by using the advertisement or brand usage experience in the memory of a consumer, requirement information of daily-life action or value of the consumer that is satisfied by using a brand, or purchasing behavior information related to a purchasing behavior of the consumer or brand usage. A display pattern parameter of information refers to how to display content of advertisement information, for example, advertisement materials such as whether the content of the advertisement information is displayed as a dynamic flash or a static gif image, a background color of the advertisement information, and background music.

404: Sending the second information and the fourth information to the terminal, so that the terminal aggregates and displays the media information.

In this example, the second information and the fourth information are sent to the terminal. After receiving the second information and the fourth information, the terminal aggregates and displays the media information (e.g., in multimedia format) included in the second information and in the fourth information. Specifically, the second information and the fourth information are displayed on the second-jump page. In an example, the more than one piece of media information included in the second information is aggregated and displayed in a first region on the second-jump page, and the more than one piece of media information included in the fourth information is aggregated and displayed in a second region on the second-jump page. The first region and the second region may be flexibly set according to a website scenario. In this way, the user can view instant and accurate recommended information content in the first region and view diverse and personalized recommended information content in the second region.

Figure 5:
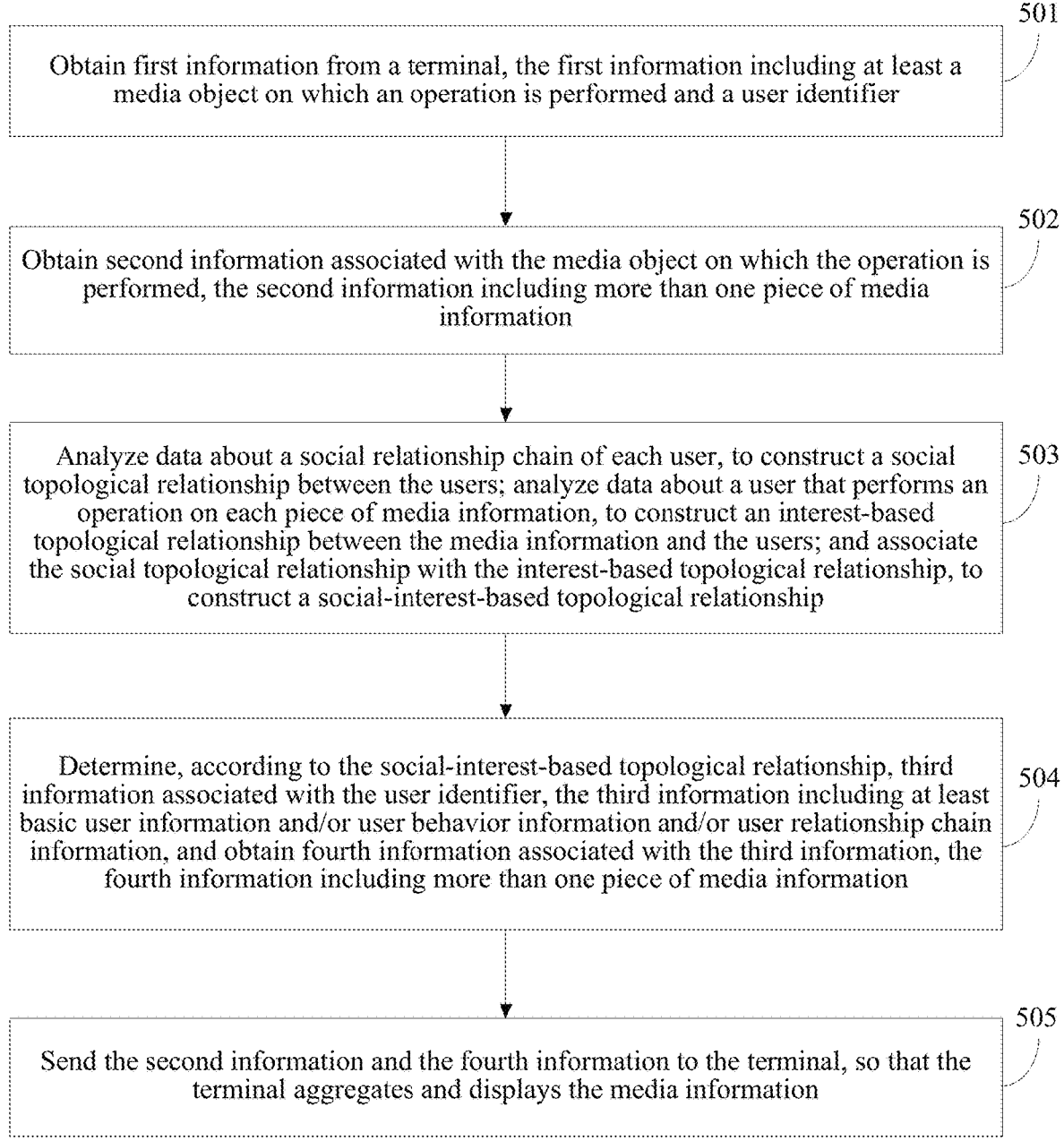
FIG. 5 is a schematic flowchart of an information processing method according to an embodiment of the present disclosure.

One embodiment provides an information processing method. As shown in FIG. 5, the method includes the followings.

501: Obtaining first information from a terminal, the first information including at least a media object on which an operation is performed and a user identifier.

Herein, the terminal is a terminal of an ordinary user (or referred to as an object to which an advertisement is to be displayed or exposed). Each user in one embodiment corresponds to one user identifier, and different users in a social network may be distinguished by using different user identifiers. In an example, the user identifier may be implemented by using any combination of characters.

When a user browses a first interface on a terminal, the first interface displays more than one media object. Herein, the first interface is referred to as a first-jump page, and each media object displayed on the first-jump page occupies an ordinary display position. The media object is an interactive object that can respond to an operation. When the media object is displayed on the first-jump page, media information corresponding to the media object is displayed as specific content, and the media information is any combination of the following information: text, a picture, a video, and audio.

When the user selects one media object to perform an operation (such as a click), the terminal adds the media object on which the operation is performed and a user identifier to the first information and sends the first information to a server. In this way, the server obtains the first information from the terminal, and parses the first information to obtain the media object on which the operation is performed and the user identifier.

502: Obtaining second information associated with the media object on which the operation is performed, the second information including more than one piece of media information.

In one embodiment, an operation performed by the user on a media object on the first-jump page explicitly indicates an instant interest of the user at that moment. Therefore, the user has a high demand for the second information associated with the media object on which the operation is performed.

In this example, the obtaining second information associated with the media object on which the operation is performed is specifically: determining a target keyword according to the media object on which the operation is performed, the target keyword is a keyword of the media object, for example, a brand of shoes, or clothes having a characteristic. Then, the keyword and all media information consistent with the target keyword are combined and are used as the second information. The second information includes more than one piece of media information, and each piece of the media information in the second information is associated with the media object, that is, consistent with the keywords.

In this example, when the second information is displayed on the terminal, the second information is displayed on a second interface. Herein, the second interface is a second-jump page, and each piece of the media information displayed on the second-jump page occupies an aggregated display position. Because the second information includes more than one piece of media information, display of the second information is aggregated display.

In this example, because the media information displayed on the second-jump page is correlated to the media object on the first-jump page, instant and accurate recommended information content can be provided to the user.

503: Analyzing data about a social relationship chain of each user, to construct social topological relationships among the users; analyzing data about users performing operation on each piece of media information, to construct interest-based topological relationships between the media information and the users; and associating the social topological relationships with the interest-based topological relationships, so as to construct social-interest-based topological relationships.

In this example, the data about the social relationship chain of each user is analyzed to construct the social topological relationships among the users, and a social graph is drawn according to the social topological relationships. During specific implementation, data about a friend relationship chain of each user is mined and analyzed by using a "person" in an online or offline social scenario as a minimum unit to construct a social topological relationship of a bidirectional relationship between friends in a social network. Herein, the bidirectional relationship between friends in the social network means that, for example, a user A is a friend of a user B, but the user B is not a friend of the user A.

In this example, the data about the users that perform the operation on each piece of media information is analyzed, so as to construct the interest-based topological relationship between the media information and the users, and an interest graph is drawn according to the interest-based topological relationship. During specific implementation, group data is clicked according to the media information, and user interest is analyzed by using an "interest point" as a minimum unit, to construct the interest-based topological relationship between groups having similar and related user interests.

Figure 6:
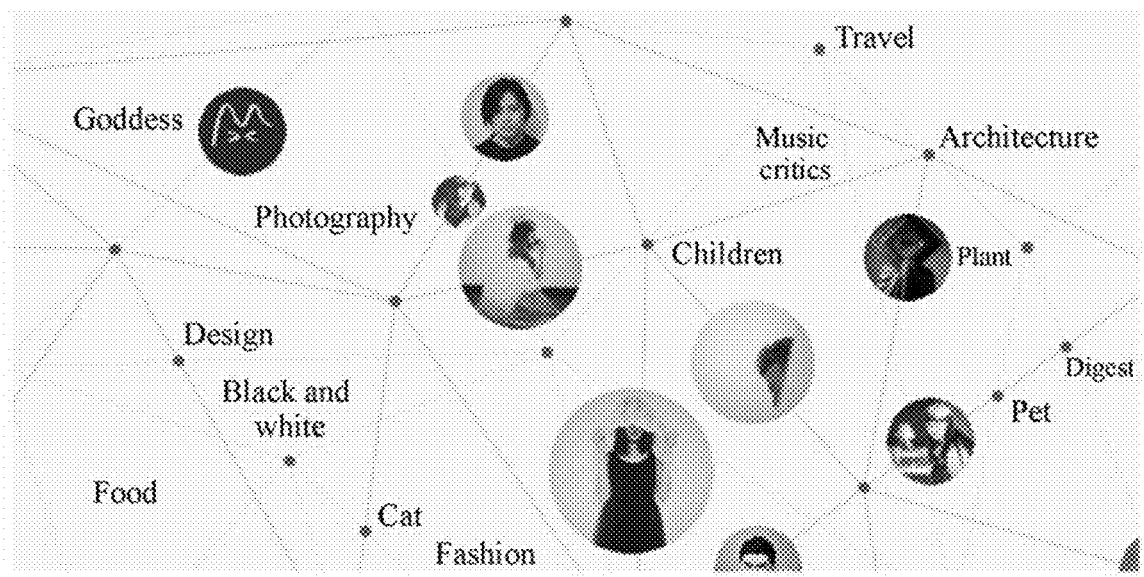
FIG. 6 is a schematic diagram of a social interest graph according to an embodiment of the present disclosure.

In this example, the social topological relationship is associated with the interest-based topological relationship, to construct social-interest-based topological relationships, and a social interest graph is drawn according to the social-interest-based topological relationships. During specific implementation, referring to FIG. 6, the social interest graph includes both relationships between users and relationships between users and interest points. Basic user information, user behavior information, and/or user relationship chain information of each user on the network can be determined according to the social-interest-based topological relationships displayed in the social interest graph.

504: Determining, according to the social-interest-based topological relationships, third information associated with the user identifier, the third information including at least basic user information, user behavior information, and/or user relationship chain information, and obtaining fourth information associated with the third information, the fourth information including more than one piece of media information.

In this example, one user identifier uniquely determines one user. The third information of the user that can be determined according to the user identifier includes the basic user information, the user behavior information, and/or the user relationship chain information. The basic user information includes, for example, the age or the gender of the user, or a region in which the user is located. The user behavior information includes, for example, whether the user likes shopping or playing games, or whether the user is interested in content of a piece of advertisement information. The user relationship chain information includes, for example, a QQ friend chain, a Wechat friend circle, friends in QQ space, high school classmates, college classmates, or a human network.

That is, the basic user information indicates natural properties of the user, the user behavior information indicates long-term interests of the user, and the user relationship chain information indicates friends of the user in the social network and interests of the friends. Based on this, the fourth information is associated with the third information, and the fourth information displayed on the second-jump page is recommended according to the natural properties, the long-term interests, and the friends of the user in the social network, and the interests of the friends. In this way, diverse and personalized recommended information content can be provided to the user.

Figure 7:
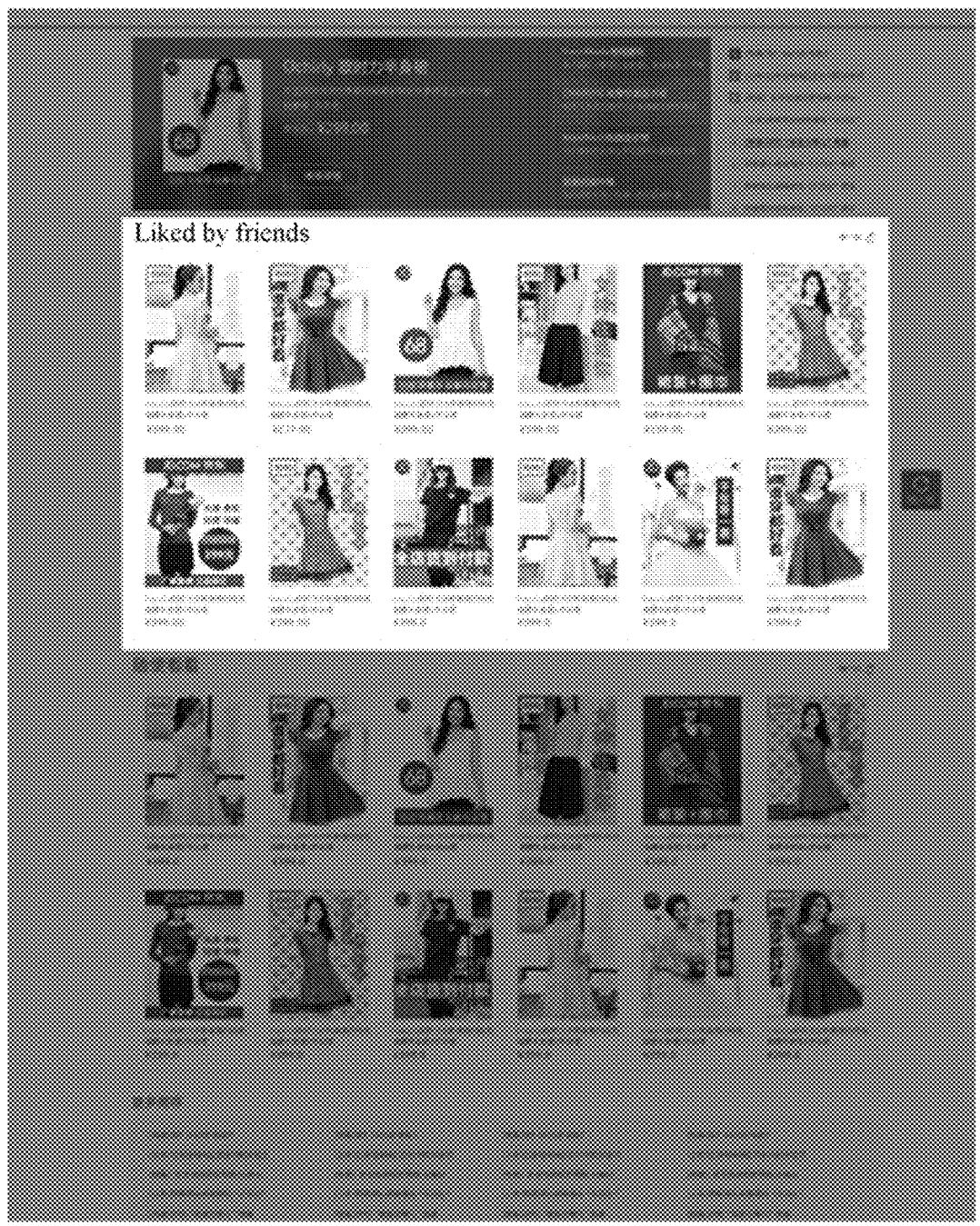
FIG. 7 is a second schematic diagram of an aggregation and display scenario according to an embodiment of the present disclosure.

Referring to FIG. 7, in an application scenario, the user clicks for a brand of clothes (the media object) on the first-jump page, and the second-jump page is popped up, on which clothes that a friend likes and that are related to the brand of the clothes are displayed. The clothes (the fourth information) that the friend likes are recommended based on an interest of the friend in the social network. In this way, diverse and personalized recommended information content can be provided to the user.

In one embodiment, all media information included in the second information and the fourth information is uploaded to the server by an advertiser (or referred to as an object providing an advertisement material or content promotion) by using a terminal of the advertiser. The media information, using an advertisement as an example, includes many types, for example, basic information of the advertisement such as expression elements (a spokesperson, an advertising copy, music, and the like) included in the advertisement, brand information such as information that is related to a brand and that is expressed by using the advertisement or brand usage experience in the memory of a consumer, requirement information of user's daily-life action or value that is satisfied by using a brand, or purchasing behavior information related to a purchasing behavior of a consumer or brand usage. A display pattern parameter of information refers to how to display content of advertisement information, for example, advertisement materials such as whether the content of the advertisement information is displayed as a dynamic flash or a static gif image, a background color of the advertisement information, and background music.

505: Sending the second information and the fourth information to the terminal, so that the terminal aggregates and displays the media information.

In this example, the second information and the fourth information are sent to the terminal. After receiving the second information and the fourth information, the terminal aggregates and displays the media information included in the second information and in the fourth information. Specifically, the second information and the fourth information are displayed on the second-jump page. In an example, the more than one piece of media information included in the second information is aggregated and displayed in a first region on the second-jump page, and the more than one piece of media information included in the fourth information is aggregated and displayed in a second region on the second-jump page. The first region and the second region may be flexibly set according to a website scenario. In this way, the user can view instant and accurate recommended information content in the first region and view diverse and personalized recommended information content in the second region.

Figure 8:
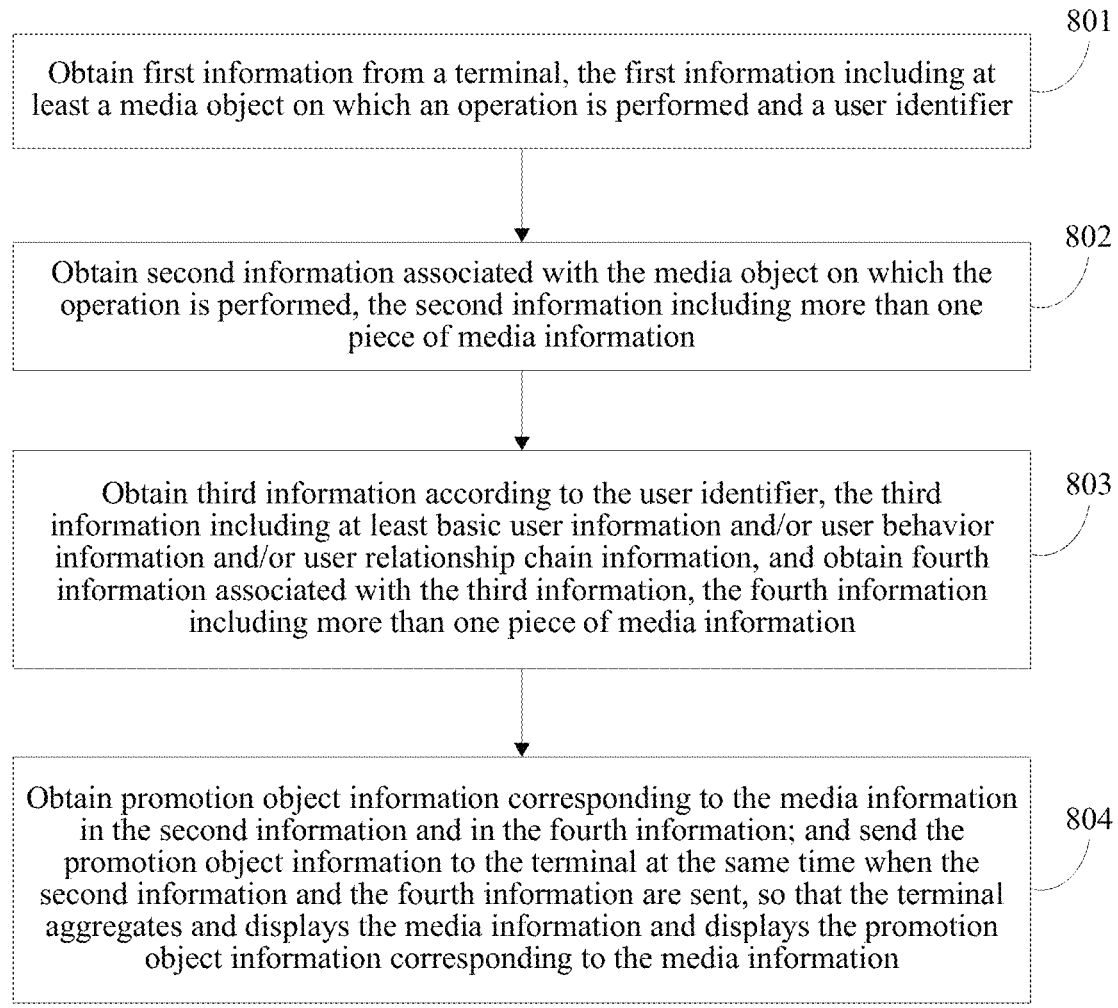
FIG. 8 is a schematic flowchart of an information processing method according to an embodiment of the present disclosure.

One embodiment provides an information processing method. As shown in FIG. 8, The method includes the followings.

801: Obtaining first information from a terminal, the first information including at least a media object on which an operation is performed and a user identifier.

Herein, the terminal is a terminal of an ordinary user (or referred to as an object to which an advertisement is to be displayed or exposed). Each user in one embodiment corresponds to one user identifier, and different users in a social network may be distinguished by using user identifiers. In an example, the user identifier may be implemented by using any combination of characters.

When a user browses a first interface on a terminal, the first interface displays more than one media object. Herein, the first interface is referred to as a first-jump page, and each media object displayed on the first-jump page occupies an ordinary display position. The media object is an interactive object that can respond to an operation. When the media object is displayed on the first-jump page, media information corresponding to the media object is displayed as specific content, and the media information is any combination of the following information: text, a picture, a video, and audio.

When the user selects one media object to perform an operation (such as a click), the terminal adds the media object on which the operation is performed and a user identifier to the first information and sends the first information (e.g., the first message) to a server. In this way, the server obtains the first information from the terminal, and parses the first information to obtain the media object on which the operation is performed and the user identifier.

802: Obtaining second information associated with the media object on which the operation is performed, the second information including more than one piece of media information.

In one embodiment, an operation performed by the user on a media object on the first-jump page explicitly indicates an instant interest of the user at that moment. Therefore, the user has a high demand for the second information associated with the media object on which the operation is performed.

In this example, the process of obtaining second information associated with the media object on which the operation is performed is specifically: determining a target keyword according to the media object on which the operation is performed, the target keyword is a keyword of the media object, for example, a brand of shoes, or clothes having a characteristic. Then, the keyword and all media information consistent with the target keyword are combined and are used as the second information. The second information includes more than one piece of media information, and each piece of the media information in the second information is associated with the media object, that is, keywords thereof are the same.

In this example, when the second information is displayed on the terminal, the second information is displayed on a second interface. Herein, the second interface is a second-jump page, and each piece of the media information displayed on the second-jump page occupies an aggregated display position. Because the second information includes more than one piece of media information, display of the second information is aggregated display.

In this example, because the media information displayed on the second-jump page is correlated to the media object on the first-jump page, instant and accurate recommended information content can be provided to the user.

803: Obtaining third information according to the user identifier, the third information including at least basic user information, user behavior information, and/or user relationship chain information, and obtaining fourth information associated with the third information, the fourth information including more than one piece of media information.

In this example, one user identifier uniquely determines one user. The third information of the user that can be determined according to the user identifier includes the basic user information, the user behavior information, and/or the user relationship chain information. The basic user information includes, for example, the age or the gender of the user, or a region in which the user is located. The user behavior information includes, for example, whether the user likes shopping or playing games, or whether the user is interested in content of a piece of advertisement information. The user relationship chain information includes, for example, a QQ friend chain, a Wechat friend circle, friends in QQ space, high school classmates, college classmates, or a human network.

That is, the basic user information indicates natural properties of the user, the user behavior information indicates long-term interests of the user, and the user relationship chain information indicates friends of the user in the social network and interests of the friends. Based on this, the fourth information is associated with the third information, and the fourth information displayed on the second-jump page is recommended according to the natural properties, the long-term interests, and the friends of the user in the social network, and the interests of the friends. In this way, diverse and personalized recommended information content can be provided to the user.

In one embodiment, all media information included in the second information and the fourth information is uploaded to the server by an advertiser (or referred to as an object providing an advertisement material or content promotion) by using a terminal of the advertiser. The media information, using an advertisement as an example, includes many types, for example, basic information of the advertisement such as expression elements (a spokesperson, an advertising copy, music, and the like) included in the advertisement, brand information such as information that is related to a brand and that is expressed by using the advertisement or brand usage experience in the memory of a consumer, requirement information of user's daily-life action or value that is satisfied by using a brand, or purchasing behavior information related to a purchasing behavior of a consumer or brand usage. A display pattern parameter of information refers to how to display content of advertisement information, for example, advertisement materials such as whether the content of the advertisement information is displayed as a dynamic flash or a static gif image, a background color of the advertisement information, and background music.

804: Obtaining promotion object information corresponding to the media information in the second information and in the fourth information; and send the promotion object information to the terminal at the same time when the second information and the fourth information are sent, so that the terminal aggregates and displays the media information and displays the promotion object information corresponding to the media information.

Figure 9:
FIG. 9 is a third schematic diagram of an aggregation and display scenario according to an embodiment of the present disclosure.

For example, the media information is an advertisement, and the promotion object information is information about an advertiser. In some scenarios, when media information is being displayed, promotion object information of the media information also needs to be displayed. In this way, the user may contact a media information promotion object. Referring to FIG. 9, when the media information such as an advertisement is aggregated and displayed on the second-jump page, information about a merchant is also displayed, which may be implemented by adding a phone button at the end of each piece of the media information, thereby further optimizing the display effect. In addition, aggregating and displaying the media information of each merchant on the second-jump page can help middle and small media information promotion objects enhance competitiveness by means of ganging up. Using advertisers as an example, middle and small long-tail advertisers face problems such as little exposure caused by few marketing funds and incompetence. The aggregation and display manner in one embodiment can provide ganging-up competitiveness to the middle and small long-tail advertisers. In this way, advertisements of multiple middle and small advertisers are aggregated on one page for display, thereby enhancing overall competitiveness and striving for more advertising exposure.

In this example, the second information and the fourth information are sent to the terminal. After receiving the second information and the fourth information, the terminal aggregates and displays the media information included in the second information and in the fourth information. Specifically, the second information and the fourth information are displayed on the second-jump page. For example, the more than one piece of media information included in the second information is aggregated and displayed in a first region on the second-jump page, and the more than one piece of media information included in the fourth information is aggregated and displayed in a second region on the second-jump page. The first region and the second region may be flexibly set according to a website scenario. In this way, the user can view instant and accurate recommended information content in the first region and view diverse and personalized recommended information content in the second region.

Figure 10:
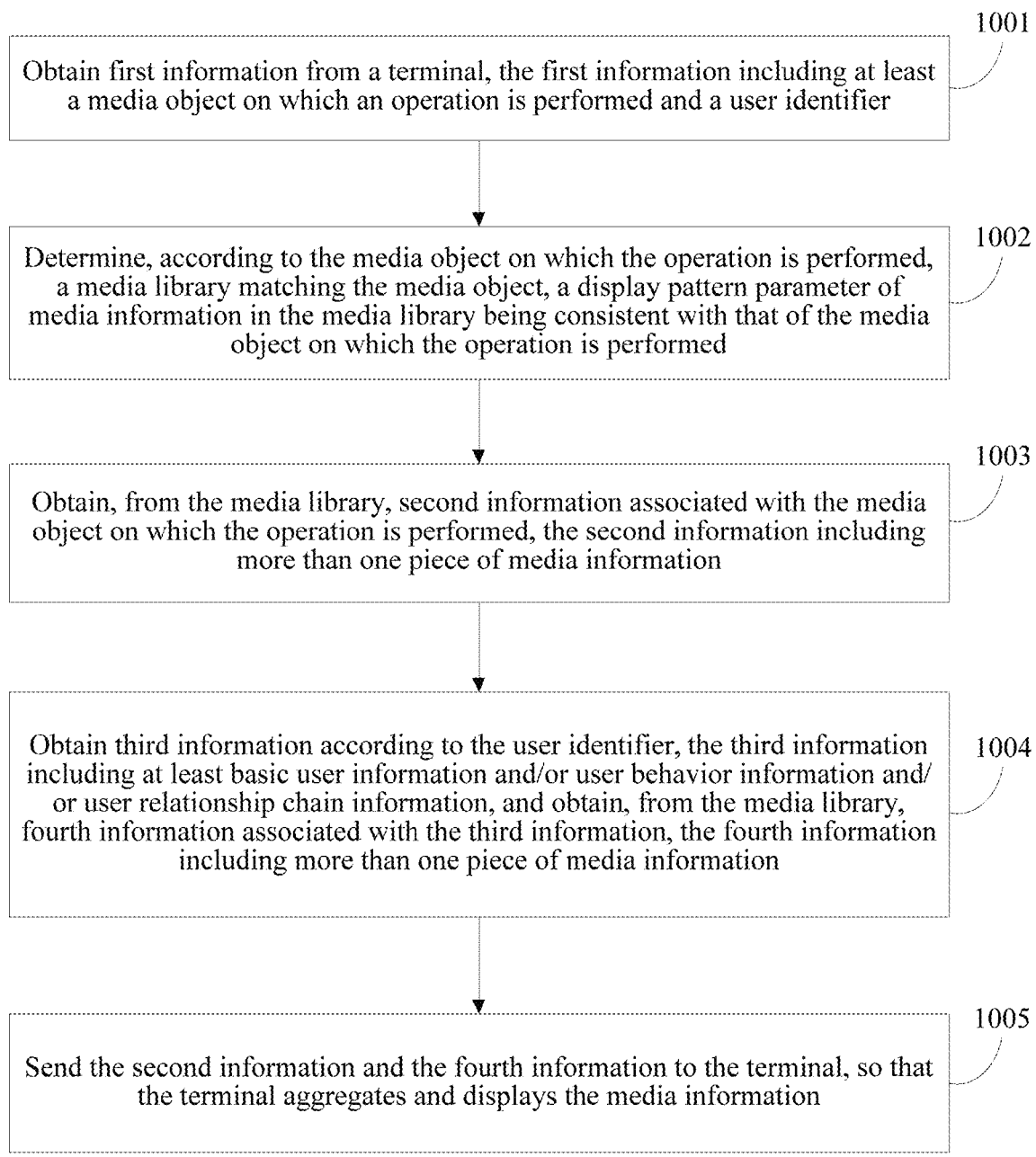
FIG. 10 is a schematic flowchart of an information processing method according to an embodiment of the present disclosure.

One embodiment provides an information processing method. As shown in FIG. 10, the method includes the followings.

1001: Obtaining first information from a terminal, the first information including at least a media object on which an operation is performed and a user identifier.

Herein, the terminal is a terminal of an ordinary user (or referred to as an object to which an advertisement is to be displayed or exposed). Each user in one embodiment corresponds to one user identifier, and different users in a social network may be distinguished by using user identifiers. In an example, the user identifier may be implemented by using any combination of characters.

When a user browses a first interface on a terminal, the first interface displays more than one media object. Herein, the first interface is referred to as a first-jump page, and each media object displayed on the first-jump page occupies an ordinary display position. The media object is an interactive object that can respond to an operation. When the media object is displayed on the first-jump page, media information corresponding to the media object is displayed as specific content, and the media information is any combination of the following information: text, a picture, a video, and audio.

When the user selects one media object to perform an operation (such as a click), the terminal adds the media object on which the operation is performed and a user identifier to the first information and sends the first information to a server. In this way, the server obtains the first information from the terminal, and parses the first information to obtain the media object on which the operation is performed and the user identifier.

1002: Determining, according to the media object on which the operation is performed, a media library matching the media object, a display pattern parameter of media information in the media library being consistent with that of the media object on which the operation is performed.

Herein, the media object has a display pattern parameter, and the display pattern parameter indicates a manner of displaying the media object, for example, displaying the media object in a product form. Specifically, the display pattern parameter includes product elements such as a product picture, a product price, a product link, and a product introduction. To enable the user to experience that the media information is displayed as a product, the media library matching the media object needs to be determined. The display pattern parameter of the media information in the media library is consistent with that of the media object on which the operation is performed. In this way, all media information in the media library is displayed as a product.

1003: Obtaining, from the media library, second information associated with the media object on which the operation is performed, the second information including more than one piece of media information.

In one embodiment, an operation performed by the user on a media object on the first-jump page explicitly indicates an instant interest of the user at that moment. Therefore, the user has a high demand for the second information associated with the media object on which the operation is performed.

In this example, the process of obtaining second information associated with the media object on which the operation is performed is specifically: determining a target keyword according to the media object on which the operation is performed, the target keyword is a keyword of the media object, for example, a brand of shoes, or clothes having a characteristic. Then, the keyword and all media information consistent with the target keyword are combined and are used as the second information. The second information includes more than one piece of media information, and each piece of the media information in the second information is associated with the media object, that is, keywords thereof are the same.

In this example, when the second information is displayed on the terminal, the second information is displayed on a second interface. Herein, the second interface is a second-jump page, and each piece of the media information displayed on the second-jump page occupies an aggregated display position. Because the second information includes more than one piece of media information, display of the second information is aggregated display.

In this example, because the media information displayed on the second-jump page is correlated to the media object on the first-jump page, instant and accurate recommended information content can be provided to the user.

1004: Obtaining third information according to the user identifier, the third information including at least basic user information, user behavior information, and/or user relationship chain information, and obtaining, from the media library, fourth information associated with the third information, the fourth information including more than one piece of media information.

In this example, one user identifier uniquely determines one user. The third information of the user that can be determined according to the user identifier includes the basic user information, the user behavior information, and/or the user relationship chain information. The basic user information includes, for example, the age or the gender of the user, or a region in which the user is located. The user behavior information includes, for example, whether the user likes shopping or playing games, or whether the user is interested in content of a piece of advertisement information. The user relationship chain information includes, for example, a QQ friend chain, a Wechat friend circle, friends in QQ space, high school classmates, college classmates, or a human network.

The basic user information indicates natural properties of the user, the user behavior information indicates long-term interests of the user, and the user relationship chain information indicates friends of the user in the social network and interests of the friends. Based on this, the fourth information is associated with the third information, and the fourth information displayed on the second-jump page is recommended according to the natural properties, the long-term interests, and the friends of the user in the social network, and the interests of the friends. In this way, diverse and personalized recommended information content can be provided to the user.

In one embodiment, all media information included in the second information and the fourth information is uploaded to the server by an advertiser (or referred to as an object providing an advertisement material or content promotion) by using a terminal of the advertiser. The media information, using an advertisement as an example, includes many types, for example, basic information of the advertisement such as expression elements (a spokesperson, an advertising copy, music, and the like) included in the advertisement, brand information such as information that is related to a brand and that is expressed by using the advertisement or brand usage experience in the memory of a consumer, requirement information of user's daily-life action or value that is satisfied by using a brand, or purchasing behavior information related to a purchasing behavior of a consumer or brand usage. A display pattern parameter of information refers to how to display content of advertisement information, for example, advertisement materials such as whether the content of the advertisement information is displayed as a dynamic flash or a static gif image, a background color of the advertisement information, and background music.

1005: Sending the second information and the fourth information to the terminal, so that the terminal aggregates and displays the media information.

In this example, the second information and the fourth information are sent to the terminal. After receiving the second information and the fourth information, the terminal aggregates and displays the media information included in the second information and in the fourth information. Specifically, the second information and the fourth information are displayed on the second-jump page. In an example, the more than one piece of media information included in the second information is aggregated and displayed in a first region on the second-jump page, and the more than one piece of media information included in the fourth information is aggregated and displayed in a second region on the second-jump page. The first region and the second region may be flexibly set according to a website scenario. In this way, the user can view instant and accurate recommended information content in the first region and view diverse and personalized recommended information content in the second region.

Figure 11:
FIG. 11 is a fourth schematic diagram of an aggregation and display scenario according to an embodiment of the present disclosure.

In this example, the second information and the fourth information that are recommended to the user are selected from the media library, and the display pattern parameter of media information in the media library is consistent with that of the media object on which the operation is performed. In this example, aggregation and display are applied to a shopping scenario. Referring to FIG. 11, aggregated and displayed media information is also displayed as a product, and is natively displayed in a social shopping scenario as media information of an advertisement. In this way, the recommended media information is presented to the user in a product form, and the user may easily click "select" among multiple interesting products (advertisements), which does not destroy user experience during marketing and avoids a wrong click performed because the user cannot distinguish an advertisement from a product.

Figure 12:
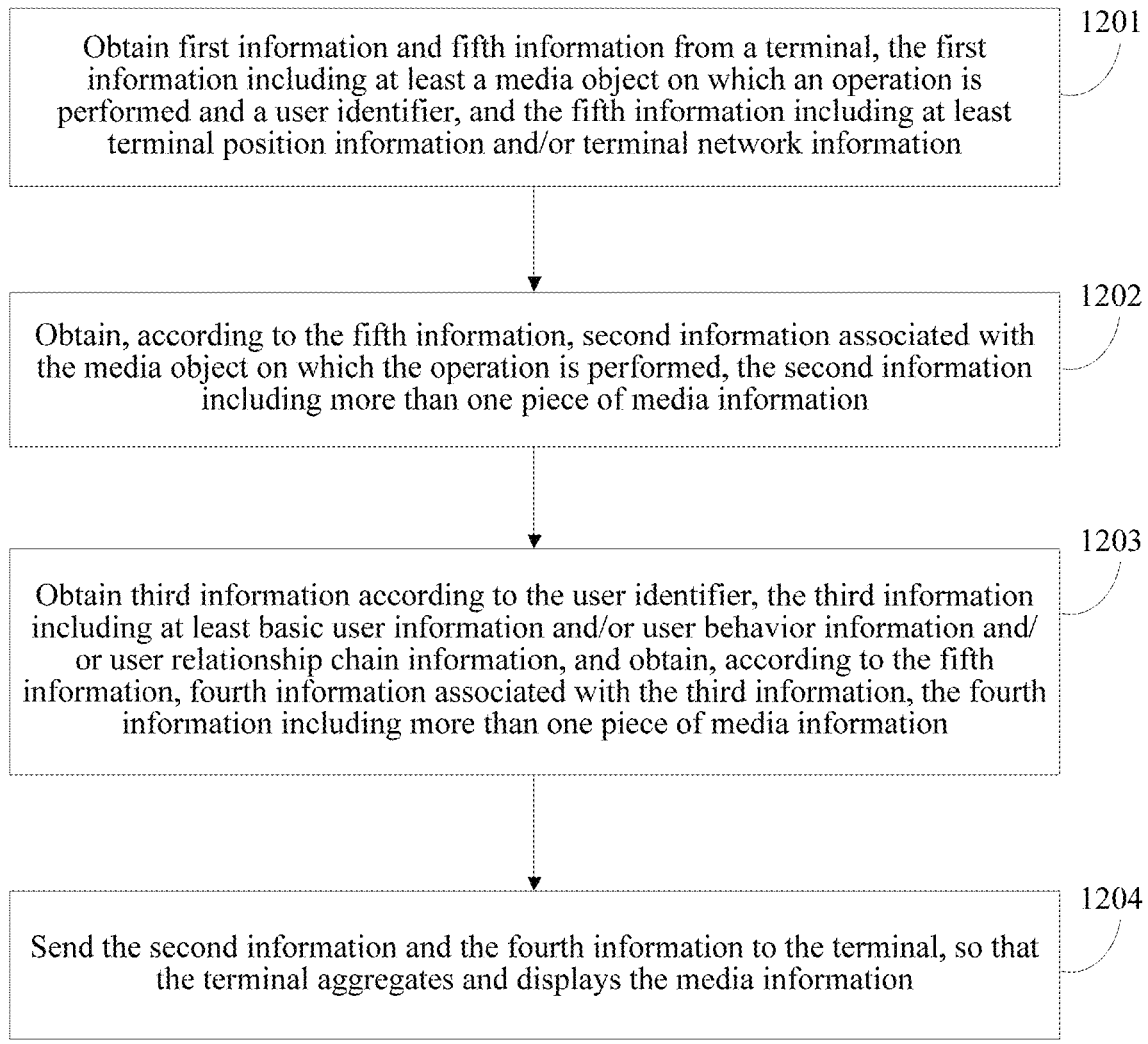
FIG. 12 is a schematic flowchart of an information processing method according to an embodiment of the present disclosure.

One embodiment provides an information processing method. As shown in FIG. 12, the method includes the followings.

1201: Obtaining first information and fifth information from a terminal, the first information including at least a media object on which an operation is performed and a user identifier, and the fifth information including at least terminal position information and/or terminal network information.

Herein, the terminal is a terminal of an ordinary user (or referred to as an object to which an advertisement is to be displayed or exposed). Each user, in one embodiment, corresponds to one user identifier, and different users in a social network may be distinguished by using user identifiers. In an example, the user identifier may be implemented by using any combination of characters.

When a user browses a first interface on a terminal, the first interface displays more than one media object. Herein, the first interface is referred to as a first-jump page, and each media object displayed on the first-jump page occupies an ordinary display position. The media object is an interactive object that can respond to an operation. When the media object is displayed on the first-jump page, media information corresponding to the media object is displayed as specific content, and the media information is any combination of the following information: text, a picture, a video, and audio.

When the user selects one media object to perform an operation (such as a click), the terminal adds the media object on which the operation is performed and a user identifier to the first information and sends the first information to a server. In this way, the server obtains the first information from the terminal, and parses the first information to obtain the media object on which the operation is performed and the user identifier.

1202: Obtaining, according to the fifth information, second information associated with the media object on which the operation is performed, the second information including more than one piece of media information.

In one embodiment, an operation performed by the user on a media object on the first-jump page explicitly indicates an instant interest of the user at that moment. Therefore, the user has a high demand for the second information associated with the media object on which the operation is performed.

In this example, the process of obtaining second information associated with the media object on which the operation is performed is specifically: determining a target keyword according to the media object on which the operation is performed, the target keyword is a keyword of the media object, for example, a brand of shoes, or clothes having a characteristic. Then, the keyword and all media information consistent with the target keyword are combined and are used as the second information. The second information includes more than one piece of media information, and each piece of the media information in the second information is associated with the media object, that is, keywords thereof are the same.

In this example, when the second information is displayed on the terminal, the second information is displayed on a second interface. Herein, the second interface is a second-jump page, and each piece of the media information displayed on the second-jump page occupies an aggregated display position. Because the second information includes more than one piece of media information, display of the second information is aggregated display.

In this example, because the media information displayed on the second-jump page is correlated to the media object on the first-jump page, instant and accurate recommended information content can be provided to the user.

1203: Obtaining third information according to the user identifier, the third information including at least basic user information, user behavior information, and/or user relationship chain information, and obtaining, according to the fifth information, fourth information associated with the third information, the fourth information including more than one piece of media information.

In this example, one user identifier uniquely determines one user. The third information of the user that can be determined according to the user identifier includes the basic user information, the user behavior information, and/or the user relationship chain information. The basic user information includes, for example, the age or the gender of the user, or a region in which the user is located. The user behavior information includes, for example, whether the user likes shopping or playing games, or whether the user is interested in content of a piece of advertisement information. The user relationship chain information includes, for example, a QQ friend chain, a Wechat friend circle, friends in QQ space, high school classmates, college classmates, or a human network.

It can be learned that the basic user information indicates natural properties of the user, the user behavior information indicates long-term interests of the user, and the user relationship chain information indicates friends of the user in the social network and interests of the friends. Based on this, the fourth information is associated with the third information, and the fourth information displayed on the second-jump page is recommended according to the natural properties, the long-term interests, and the friends of the user in the social network, and the interests of the friends. In this way, diverse and personalized recommended information content can be provided to the user.

In one embodiment, all media information included in the second information and the fourth information is uploaded to the server by an advertiser (or referred to as an object providing an advertisement material or content promotion) by using a terminal of the advertiser. The media information, using an advertisement as an example, includes many types, for example, basic information of the advertisement such as expression elements (a spokesperson, an advertising copy, music, and the like) included in the advertisement, brand information such as information that is related to a brand and that is expressed by using the advertisement or brand usage experience in the memory of a consumer, requirement information of user's daily-life action or value that is satisfied by using a brand, or purchasing behavior information related to a purchasing behavior of a consumer or brand usage. A display pattern parameter of information refers to how to display content of advertisement information, for example, advertisement materials such as whether the content of the advertisement information is displayed as a dynamic flash or a static gif image, a background color of the advertisement information, and background music.

1204: Sending the second information and the fourth information to the terminal, so that the terminal aggregates and displays the media information.

In this example, the second information and the fourth information are sent to the terminal. After receiving the second information and the fourth information, the terminal aggregates and displays the media information included in the second information and in the fourth information. Specifically, the second information and the fourth information are displayed on the second-jump page. In an example, the more than one piece of media information included in the second information is aggregated and displayed in a first region on the second-jump page, and the more than one piece of media information included in the fourth information is aggregated and displayed in a second region on the second-jump page. The first region and the second region may be flexibly set according to a website scenario. In this way, the user can view instant and accurate recommended information content in the first region and view diverse and personalized recommended information content in the second region.

Figure 13:
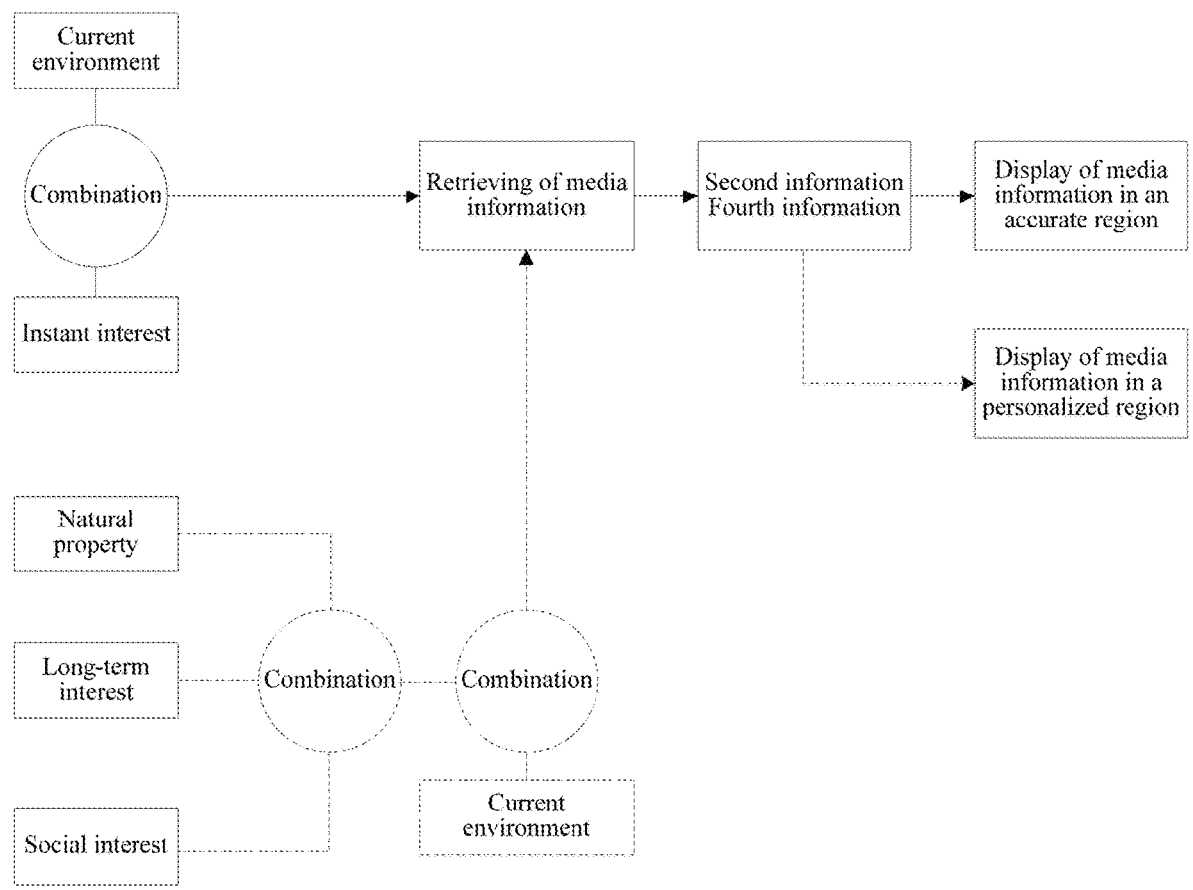
FIG. 13 is a flowchart of accurate recommendation and personalized recommendation according to an embodiment of the present disclosure.

In one embodiment, media information recommendation on the second-jump page is classified into accurate recommendation and personalized recommendation. The accurate recommendation corresponds to the second information, and the personalized recommendation corresponds to the fourth information. Referring to FIG. 13, a solid line process is the accurate recommendation, and a dotted line process is the personalized recommendation. For the accurate recommendation, a media object on which an operation is performed indicates an instant interest of a user, and then media information is retrieved with reference to environment information (the fifth information) of the terminal, to obtain the second information. The media information is displayed in a region corresponding to the second information. For the personalized recommendation, the natural properties (the basic user information), the long-term interests (the user behavior information), and the social interests (the user relationship chain information) are combined, and then media information is retrieved with reference to environment information (the fifth information) of the terminal, to obtain the fourth information. The media information is displayed in a region corresponding to the fourth information. Instant, accurate, and personalized media information recommendation brings a higher click rate and a higher return on investment of the media information.

Figure 14:
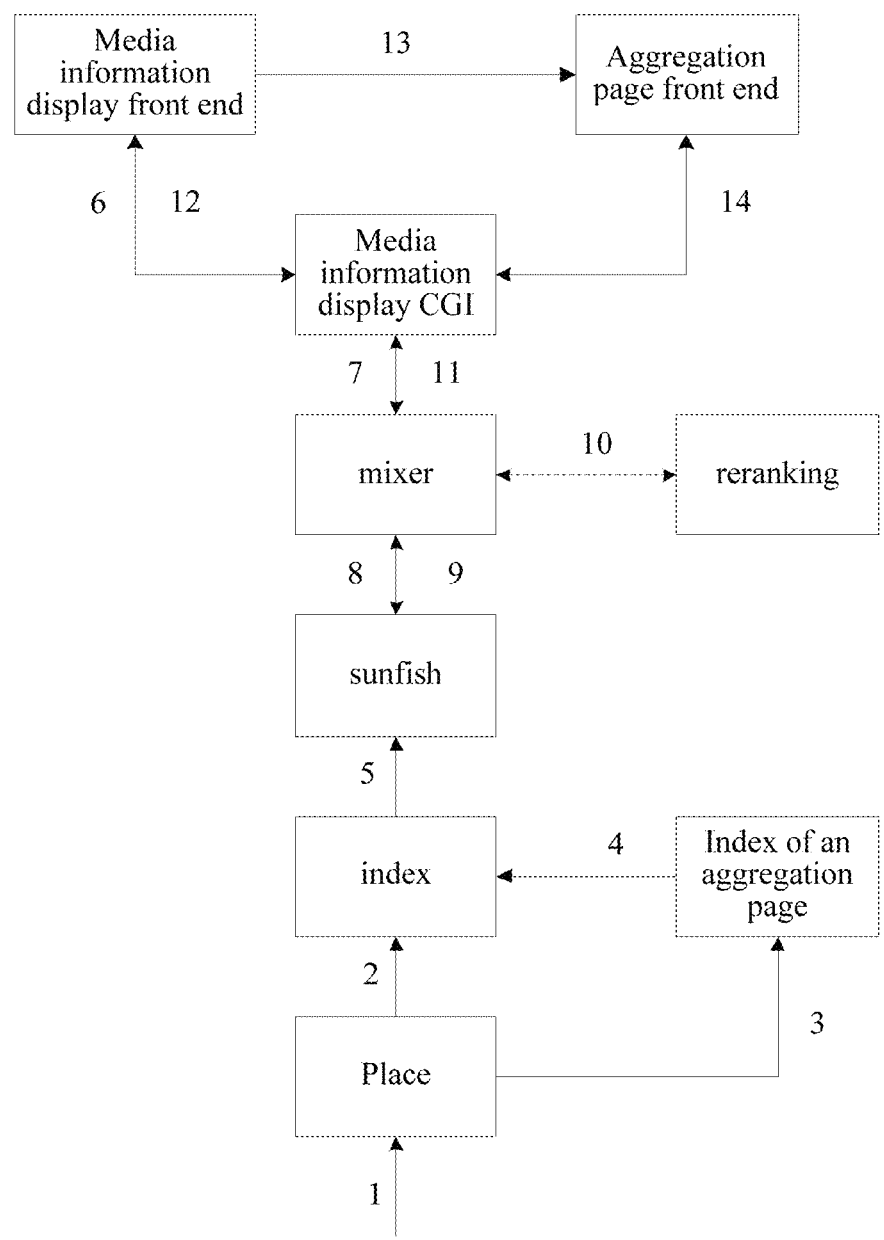
FIG. 14 is a diagram of a process from placing media information to aggregating and displaying the media information according to an embodiment of the present disclosure.

Referring to FIG. 14, FIG. 14 is a diagram of a process from placing media information to aggregating and displaying the media information according to one embodiment of the present disclosure.

From Block 1 to Block 5, a single page web application (SPA) places a media object on a first-jump page (charged by using virtual currency); a media information promotion object places media information on a second-jump page, or directly selects existing media information from a current media information library as media information on a second-jump page. More specifically, the process includes the followings.

Step 1: Subscribing to and publishing media information on the first-jump page and the media information on the second jump page together.

Step 2: Reading the media information on the first-jump page, searching the entire library, e.g., off-line search, to find all media information related to the media information on the first-jump page, and adding a new direction ID to the media information, for example, the newly added direction ID being an ID of the media information on the first-jump page.

Steps 3 and 4: Adding the result outputted from an index of the aggregation page to an index. If the media information on the second-jump page is newly placed, steps 3 and 4 are not performed.

Step 5: Loading the index to an online sunfish. The offline process, if any, is complete.

Steps 6-14 may be an online search process, as follows.

Step 6: A media information display front end requests media information from a media information display CGI. This is the first-time media information request.

Step 7: The media information display CGI requests the media information from the mixer.

Step 8: The mixer requests from the sunfish.

Step 9: The sunfish finds the media information on the first-jump page if the media information on the first-jump page meets this direction recommendation and an effective cost per mille (ECPM) ranks top 75, and sends the media information to the mixer.

Step 10: reranking module calculates an ECPM of the media information on the first-jump page.

Here, the media information on the first-jump page is not billed, and a formula for calculating the cost per click cpc_1 of the media information on the first-jump page is cpc_1=sum{ctr_2×cpc_2}, where ctr_2 and cpc_2 respectively represent a click rate and a bid price of the media information on the second-jump page.

Step 11: The mixer returns the media information on the first-jump page to the media information display CGI. If there is no media information on the first-jump page, normal media information is returned.

Step 12: Displaying the media information on the first-jump page to the media information display front end.

Step 13: Switching to an aggregation page front end if a user clicks the media information on the first-jump page.

The aggregation page front end requests the media information display CGI again by using the "ID of the media information on the first-jump page" as a parameter. This is the second-time media information request. The next process is the second-time media information request. Different from an ordinary media information request, in the second-time media information request, the media information on the first-jump page needs to be considered. During searching, the ID of the media information on the first-jump page is used as a searching condition to retrieve other media information related to the media information on the first-jump page.

Figure 15:
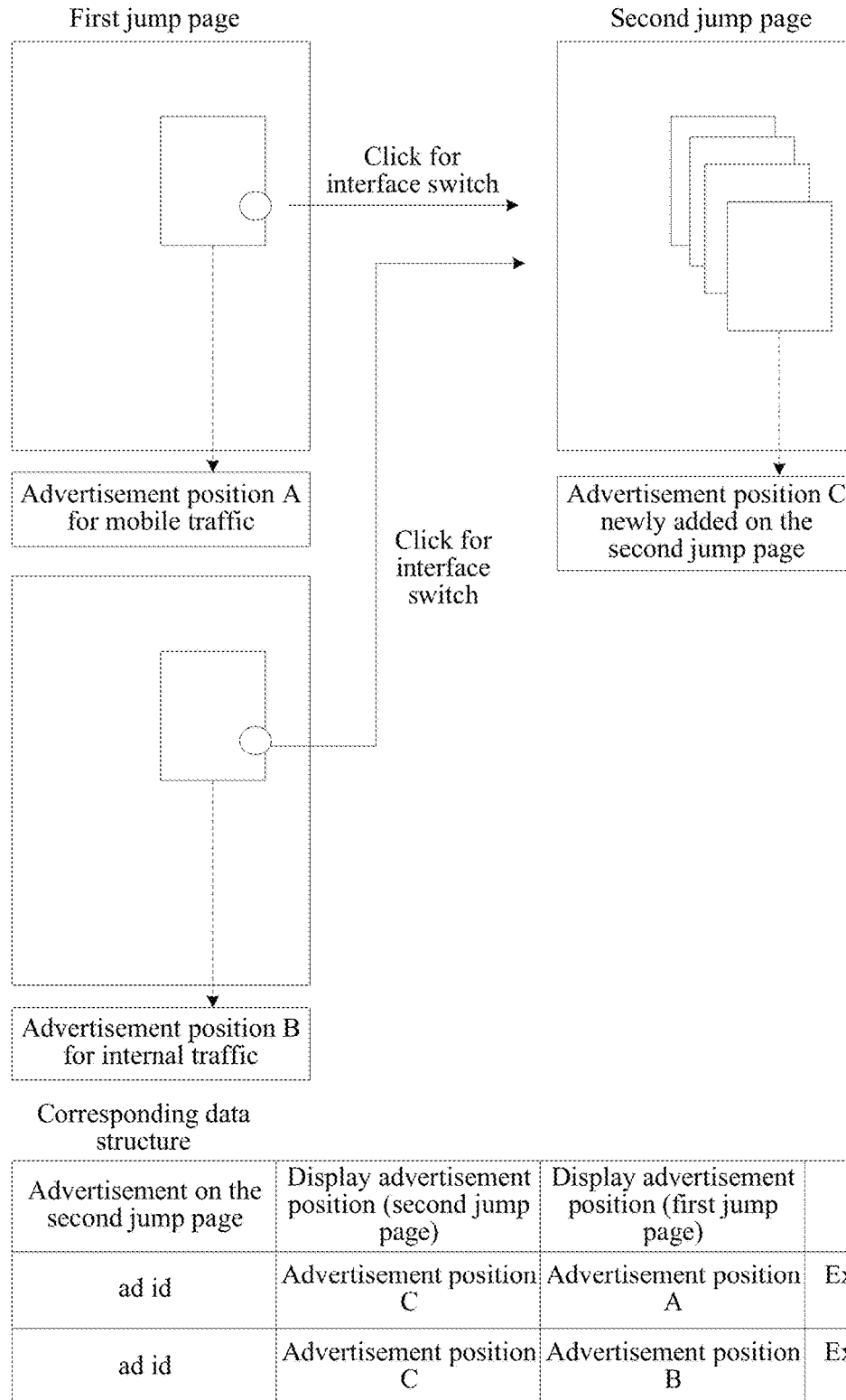
FIG. 15 is a schematic diagram of an association between media information positions according to an embodiment of the present disclosure.

To better integrate traffic of the media information on the aggregation page (the second-jump page) and ordinary traffic, a media information position on the second-jump page is associated with a media information position on the first-jump page. Referring to FIG. 15, the followings may be flexibly implemented by means of this association: income of the second-jump page is added to the traffic of the media information position on the first-jump page, and the value of the media information on the aggregation page and the value of the traffic are bonded by semi-decoupling. In addition, it may be traced back the traffic position on the first-jump page from which a second jump page is introduced, facilitating optimized tracing of items on the aggregation page.

For example, the media information is an advertisement. When placing advertisements, most advertisers do not necessarily know which users their products are suitable to be placed to, leading to little exposure and a low click rate. The aggregation and display manner in one embodiment greatly helps the advertisers optimize an advertising effect.

From the perspective of optimizing a direction requirement, the advertiser may perform direction placement (i.e., a directed placement) according to an interest tag of a user, for example, an interest in ecommerce shopping. In addition, the advertiser may also perform direction placement according to an advertisement click behavior, for example, an interest in purchasing a brand of women's clothes, a brand of cosmetics, or a product. During placement, the advertiser may place an advertisement to a user who has browsed related products or brands. Moreover, the advertiser may also perform direction placement according to historically clicked media information on the first-jump page and the second-jump page. For example, an advertisement tag on the first-jump page is "dresses and summer clothing", and if a user clicks the tag, it indicates that the user is interested in dresses and summer clothing. Advertisements on the second-jump page are dynamically calculated, and the advertisements on the aggregation page are sorted according to correlation scores.

Figure 16:
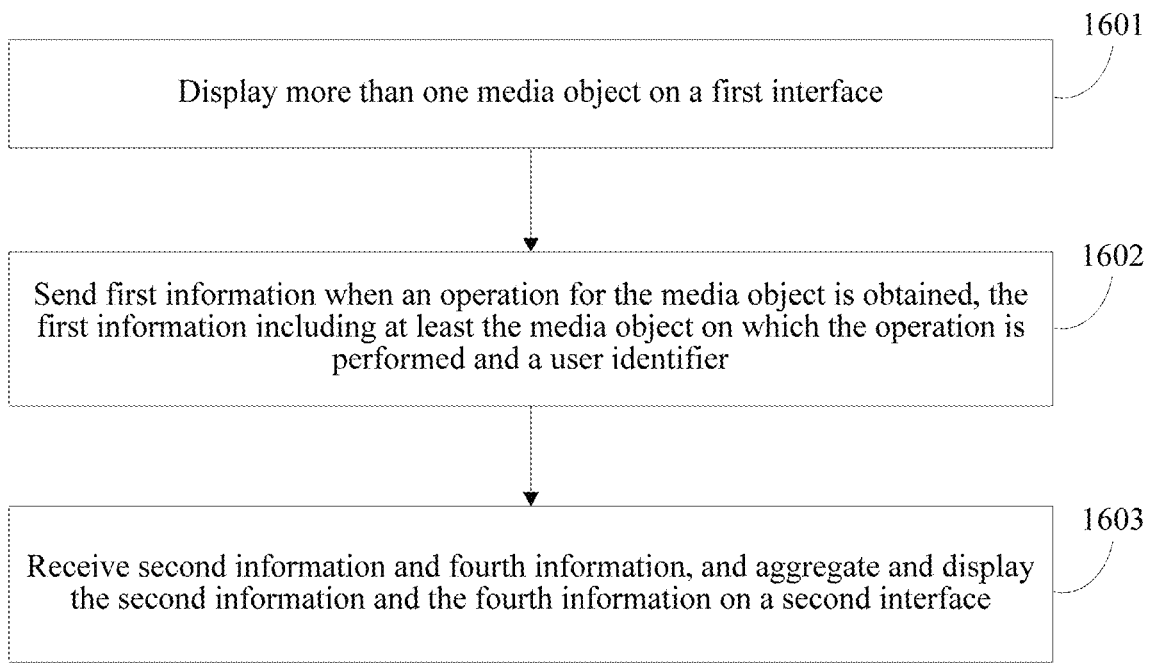
FIG. 16 is a schematic flowchart of an information processing method according to an embodiment of the present disclosure.

One embodiment of the present disclosure provides an information processing method. As shown in FIG. 16, the method includes the followings.

1601: Displaying more than one media object on a first interface.

Here, the first interface is referred to as a first-jump page.

1602: Sending first information when an operation for the media object is obtained, the first information including at least the media object on which the operation is performed and a user identifier.

1603: Receiving second information and fourth information, and aggregating and displaying the second information and the fourth information on a second interface.

Here, the second interface is referred to as a second-jump page.

The second information includes more than one piece of media information associated with the media object on which the operation is performed, and the fourth information includes more than one piece of media information associated with basic user information, user behavior information, and/or user relationship chain information determined according to the user identifier.

In this example, promotion object information corresponding to the media information in the second information and in the fourth information is received at the same time when the second information and the fourth information are received.

The promotion object information corresponding to the media information in the second information and in the fourth information is displayed at the same time when the second information and the fourth information are aggregated and displayed on the second interface.

This embodiment of the present disclosure is applied on a terminal side, an object interacted with a terminal is on a server side. A method for obtaining second information and fourth information according to first information is similar to that in the foregoing embodiment. Details are not described again.

Figure 17:
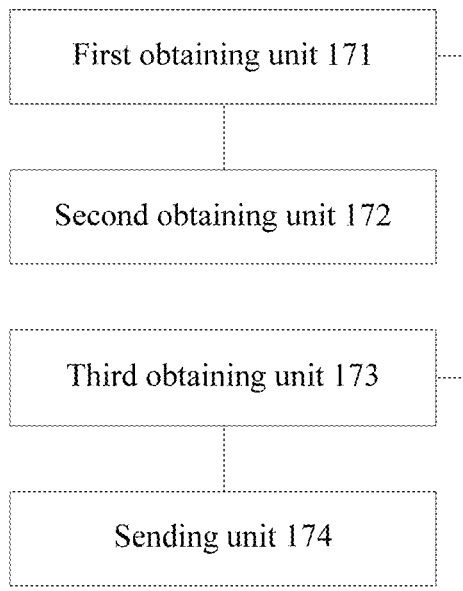
FIG. 17 is a schematic structural composition diagram of a server according to an embodiment of the present disclosure.

In one embodiment, a server is provided as shown in FIG. 17. The server includes: a first obtaining unit 171, a second obtaining unit 172, a third obtaining unit 173, and a sending unit 174.

The first obtaining unit 171 is configured to obtain first information from a terminal, the first information including at least a media object on which an operation is performed and a user identifier.

The second obtaining unit 172 is configured to obtain second information associated with the media object on which the operation is performed, the second information including more than one piece of media information.

The third obtaining unit 173 is configured to: obtain third information according to the user identifier, the third information including at least basic user information, user behavior information, and/or user relationship chain information, and obtain fourth information associated with the third information, the fourth information including more than one piece of media information.

The sending unit 174 is configured to send the second information and the fourth information to the terminal, so that the terminal aggregates and displays the media information.

It should be noted that the foregoing description related to the server is similar to that of the foregoing methods. For technical details not disclosed in this server embodiment of the present disclosure, it can refer to the description of the method embodiments of the present disclosure.

Figure 18:
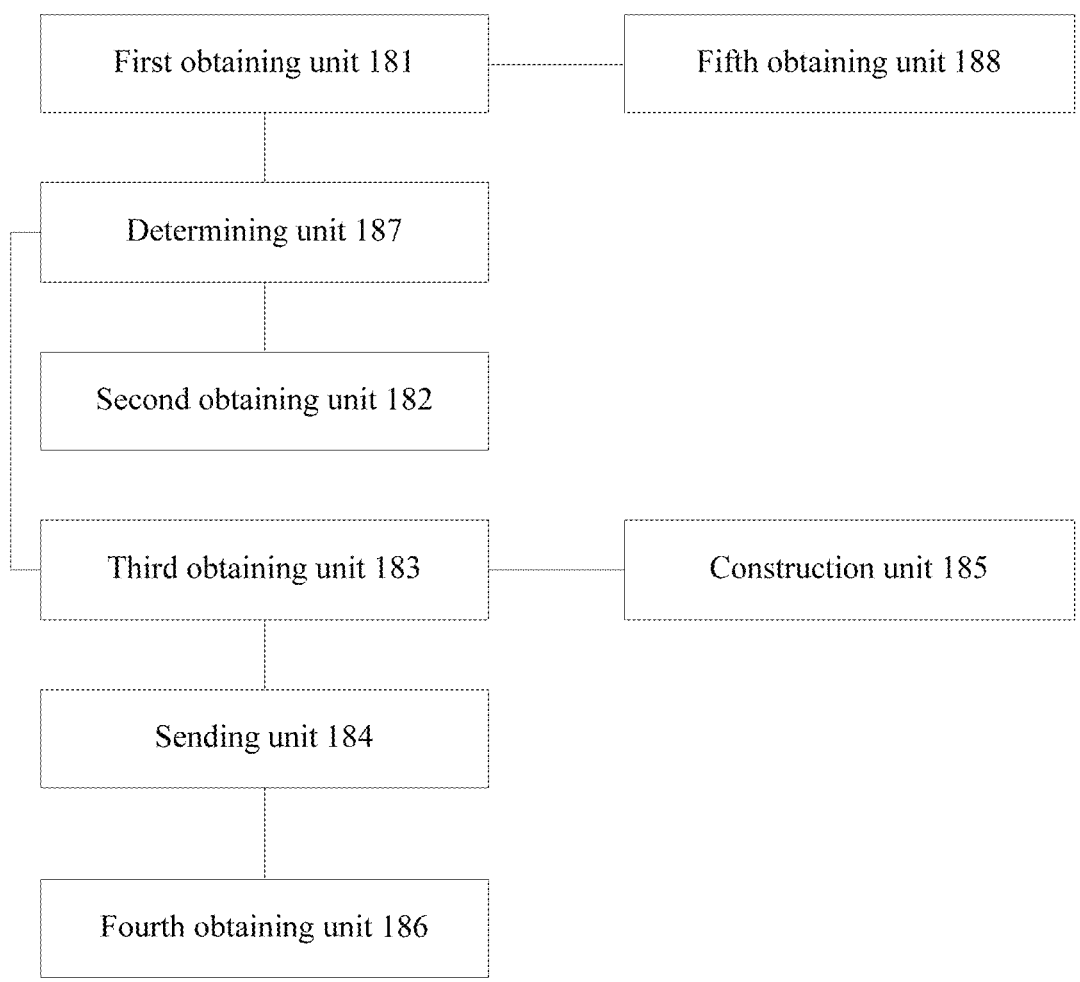
FIG. 18 is a schematic structural composition diagram of a server according to an embodiment of the present disclosure.

According to one embodiment of the present disclosure, a server is provided as shown in FIG. 18. The server includes: a first obtaining unit 181, a second obtaining unit 182, a third obtaining unit 183, a sending unit 184, and a construction unit 185.

The first obtaining unit 181 is configured to obtain first information from a terminal, the first information including at least a media object on which an operation is performed and a user identifier.

The second obtaining unit 182 is configured to obtain second information associated with the media object on which the operation is performed, the second information including more than one piece of media information.

The third obtaining unit 183 is configured to: obtain third information according to the user identifier, the third information including at least basic user information, user behavior information, and/or user relationship chain information, and obtain fourth information associated with the third information, the fourth information including more than one piece of media information.

The sending unit 184 is configured to send the second information and the fourth information to the terminal, so that the terminal aggregates and displays the media information.

The construction unit 185 is configured to analyze data about a social relationship chain of each user, to construct a social topological relationship between the users; analyze data about a user that performs an operation on each piece of media information, to construct an interest-based topological relationship between the media information and the users; and associate the social topological relationship with the interest-based topological relationship, to construct a social-interest-based topological relationship.

The third obtaining unit 183 is further configured to determine, according to the social-interest-based topological relationship, the third information associated with the user identifier.

The server further includes a fourth obtaining unit 186, and the fourth obtaining unit 186 is configured to obtain promotion object information corresponding to the media information in the second information and in the fourth information. The sending unit 184 is further configured to send the promotion object information to the terminal at the same time when the second information and the fourth information are sent, so that the terminal displays the promotion object information corresponding to the media information.

The server further includes a determining unit 187, configured to determine, according to the media object on which the operation is performed, a media library matching the media object, a display pattern parameter of media information in the media library being consistent with that of the media object on which the operation is performed. The second obtaining unit 182 is further configured to obtain, from the media library, the second information associated with the media object on which the operation is performed. The third obtaining unit 183 is further configured to obtain, from the media library, the fourth information associated with the media object on which the operation is performed.

The server further includes a fifth obtaining unit 188, configured to obtain fifth information from the terminal, the fifth information including at least terminal position information and/or terminal network information. The second obtaining unit 182 is further configured to obtain, according to the fifth information, the second information associated with the media object on which the operation is performed. The third obtaining unit 183 is further configured to obtain, according to the fifth information, the fourth information associated with the media object on which the operation is performed.

It should be noted that the foregoing description related to the server is similar to that of the foregoing method. Details are not described again. For technical details not disclosed in this server embodiment of the present disclosure, refer to the description of the method embodiments of the present disclosure.

Figure 19:
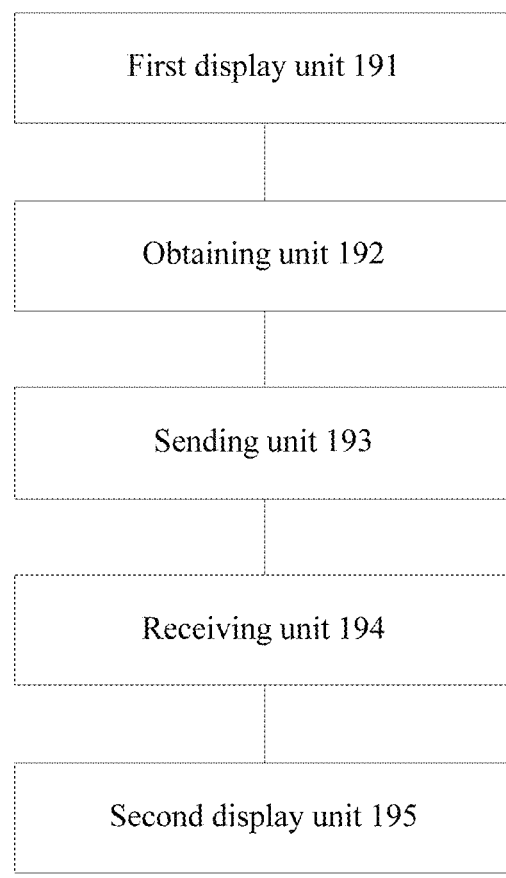
FIG. 19 is a schematic structural composition diagram of a terminal according to an embodiment of the present disclosure.

According to one embodiment of the present disclosure, a terminal is provided as shown in FIG. 19. The terminal includes: a first display unit 191, an obtaining unit 192, a sending unit 193, a receiving unit 194, and a second display unit 195.

The first display unit 191 is configured to display more than one media object on a first interface. The obtaining unit 192 is configured to obtain an operation for the media object. The sending unit 193 is configured to send first information when the obtaining unit obtains the operation for the media object, the first information including at least the media object on which the operation is performed and a user identifier. The receiving unit 194 is configured to receive second information and fourth information. The second display unit 195 is configured to aggregate and display the second information and the fourth information on a second interface.

The second information includes more than one piece of media information associated with the media object on which the operation is performed, and the fourth information includes more than one piece of media information associated with basic user information, user behavior information, and/or user relationship chain information determined according to the user identifier.

The receiving unit 194 is further configured to receive promotion object information corresponding to the media information in the second information and in the fourth information at the same time when the second information and the fourth information are received.

The second display unit 195 is further configured to display the promotion object information corresponding to the media information in the second information and in the fourth information at the same time when the second information and the fourth information are mixed and displayed on the second interface.

In the several embodiments provided in this application, it should be understood that the disclosed device and method may be implemented in other manners. The described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between the components may be implemented by using some interfaces. The indirect couplings or communication connections between the devices or units may be implemented in electronic, mechanical, or other forms.

The units described as separate parts may or may not be physically separate, and the parts displayed as units may or may not be physical units, that is, may be located in one position, or may be distributed on a plurality of network units. Some or all of the units may be selected to achieve the objectives of the solutions of the embodiments according to actual needs.

In addition, the functional units in the embodiments of the present disclosure may be integrated into one processing unit, or each of the units may exist alone physically, or two or more units may be integrated into one unit. The integrated units may be implemented in a form of hardware, or may be implemented in a form of a software functional unit.

Persons of ordinary skill in the art may understand that some or all of the steps in the method embodiments may be implemented by a program instructing relevant hardware. The program may be stored in a computer readable storage medium. When the program is executed, the steps in the method embodiments are performed. The storage medium may be any medium that is capable of storing program code, such as a portable storage device, a read-only memory (ROM, Read-Only Memory), a random-access memory (RAM, Random Access Memory), a magnetic disk, or an optical disk.

Alternatively, when the integrated unit in the present disclosure is implemented in the form of the software functional module and sold or used as a separate product, the integrated unit may be stored in a computer readable storage medium. Based on such an understanding, the technical solutions of the embodiments of the present disclosure essentially, or the part contributing to the existing technology may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure.

The storage medium may be any medium that is capable of storing program code, such as a portable storage device, a ROM, a RAM, a magnetic disk, or an optical disk. Correspondingly, an embodiment of the present disclosure provides a computer storage medium storing a computer program, the computer program being used for performing the foregoing information processing method in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An information displaying method, comprising:
    displaying at least a media object on a first interface on a terminal;
    sending, from the terminal to a server, first information upon detecting an operation for the media object, the first information comprising the media object and a user identifier;
    obtaining, by the server, third information according to the user identifier and social-interest-based topological relationships of the user identifier, the third information comprising at least basic user information, user behavior information, and user relationship chain information;

determining, by the server, second information solely according to the first information and fourth information associated with third information that reflects the interest-based topological relationships of user identifier, the second information and the fourth information each comprising more than one piece of media information, wherein the fourth information associated with the third information comprises a candidate piece of media information that a friend user from the social-interest-based topological relationships has an interest in, the candidate piece of media information that the friend user has an interest in belonging to a same product brand as the media object being operated on;

receiving, by the terminal, the second information and the fourth information sent by the server;

aggregating and displaying, by the terminal, the more than one piece of media information in the second information in a first region on a second interface according to a first aggregation layout; and aggregating and displaying, by the terminal, the more than one piece of media information in the fourth information in a second region on the second interface according to a second aggregation layout different from the first aggregation layout, such that instant and accurate recommended content based on the media object is viewable on the first region, and diverse and personalized recommended content based on the user identifier is viewable on the second region, wherein a first cost per click (CPC) rate of the media object on the first interface is a sum of prices of the more than one piece of media information displayed on the second interface, and each price of the more than one piece of media information is positively related to a second CPC rate and a click-through rate of the corresponding piece of media information.

2. The information displaying method according to claim 1, wherein the method further comprises:
analyzing data about a social relationship chain of each user to construct social topological relationships between the users;
analyzing data about users performing operation on each piece of media information to construct interest-based topological relationships between the media information and the users; and
associating the social topological relationships with the interest-based topological relationships to construct social-interest-based topological relationships.

3. The information displaying method according to claim 1, wherein the method further comprises:
obtaining promotion object information corresponding to the media information in the second information and the fourth information; and
sending the promotion object information to the terminal at the same time when the second information and the fourth information is sent, such that the terminal displays the promotion object information corresponding to the media information.

4. The information displaying method according to claim 1, wherein the method further comprises:
determining, according to the media object on which the operation is performed, a media library matching the media object, a display pattern parameter of media information in the media library being consistent with that of the media object on which the operation is performed;
obtaining, from the media library, the second information associated with the media object on which the operation is performed; and
obtaining, from the media library, the fourth information associated with the third information.

5. The information displaying method according to claim 1, wherein the method further comprises:
obtaining fifth information from the terminal, the fifth information comprising at least terminal position information and terminal network information;
obtaining, according to the fifth information, the second information associated with the media object on which the operation is performed; and
obtaining, according to the fifth information, the fourth information associated with the third information.

6. The information displaying method according to claim 1, wherein the method further comprises:
receiving, by the terminal, promotion object information corresponding to the media information in the second information and the fourth information at the same time when the second information and the fourth information are received; and
displaying, on the terminal, the promotion object information corresponding to the media information in the second information and the fourth information at the same time when the second information and the fourth information are aggregated and displayed on the second interface.

7. The method according to claim 1, further comprising:
displaying, by the terminal, in a third region on the second interface, the media object on which the operating is performed.

8. The method according to claim 1, wherein
the promotion object information corresponding to the candidate piece of media information comprised in the fourth information includes contact information of a merchant of the product brand; and
the method further comprises: displaying a phone button to initiate a call to the merchant corresponding to a displayed piece of media information according to the contact information of the merchant.

9. The method according to claim 1, wherein the first CPC rate of the media object on the first interface is not billed.

10. The method according to claim 1, wherein each price of the more than one piece of media information displayed on the second interface is a product of the second CPC rate and the click-through rate of the corresponding piece of media information.

11. An information processing terminal, comprising:
a memory storing instructions; and
a processor coupled to the memory and, when executing the instructions, configured for:
displaying at least a media object on a first interface on the terminal;
sending, from the terminal, first information upon detecting an operation for the media object, the first information comprising the media object and a user identifier;
receiving, by the terminal, second information associated with the media object and fourth information associated with third information obtained according to the user identifier, the second information and the fourth information each comprising more than one piece of media information, and the third information comprising at least basic user information, user behavior information, and user relationship chain information, wherein each recommended piece of media information comprised in the second information is determined explicitly according to the first information, the third information associated with the user identifier is determined according to social-interest-based topological relationships, and the fourth information associated with the third information comprises a candidate piece of media information that a friend user from the social-interest-based topological relationships has an interest in, the candidate piece of media information belonging to a same information provider as a recommended piece of media information comprised in the second information, the recommended piece of media information comprised in the second information includes a media object of a product brand, and the candidate piece of media information comprised in the fourth information is a media object of a product belonging to the product brand;

receiving more than one piece of promotion object information corresponding to the more than one piece of media information in the fourth information at a same time of receiving the fourth information, each promotion object information corresponding to one media information in the fourth information, the promotion object information corresponding to the candidate piece of media information comprised in the fourth information includes contact information of a merchant of the product brand;

aggregating and displaying the more than one piece of media information in the second information in a first region on a second interface according to a first aggregation layout; and aggregating and displaying the more than one piece of media information in the fourth information and the more than one piece of promotion object information in a second region on the second interface according to a second aggregation layout different from the first aggregation layout, such that instant and accurate recommended content based on the media object is viewable on the first region, and diverse and personalized recommended content based on the user identifier is viewable on the second region, wherein displaying the more than one piece promotion object information comprises: displaying a phone button to initiate a call to the merchant corresponding to a displayed piece of media information according to the contact information of the merchant, wherein a first cost per click (CPC) rate of the media object on the first interface is a sum of prices of the more than one piece of media information displayed on the second interface, and each price of the more than one piece of media information is positively related to a second CPC rate and a click-through rate of the corresponding piece of media information.

12. The terminal according to claim 11, wherein the social-interest-based topological relationships are obtained by:

analyzing data about a social relationship chain of each user to construct social topological relationships between the users;

analyzing data about users performing operation on each piece of media information to construct interest-based topological relationships between the media information and the users; and associating the social topological relationships with the interest-based topological relationships to construct the social-interest-based topological relationships.

13. The terminal according to claim 11, wherein the processor is further configured for:

obtaining, from a media library, the second information associated with the media object on which the operation is performed, wherein all media information comprised in the media library has a display pattern parameter consistent with that of the media object on which the operation is performed; and obtaining, from the media library, the fourth information associated with the third information.

14. The terminal according to claim 11, wherein the processor is further configured for:

sending fifth information from the terminal, the fifth information comprising at least terminal position information and terminal network information;

wherein the second information associated with the media object on which the operation is performed is obtained according to the fifth information; and the fourth information associated with the third information is obtained according to the fifth information.

15. The terminal according to claim 11, wherein the processor is further configured for:

receiving promotion object information corresponding to the media information in the second information and the fourth information at the same time when the second information and the fourth information are received; and displaying the promotion object information corresponding to the media information in the second information and the fourth information at the same time when the second information and the fourth information are aggregated and displayed on the second interface.

16. A non-transitory computer-readable storage medium containing computer-executable instructions that, when executed by one or more processors of a terminal, cause the one or more processors to perform:

displaying at least a media object on a first interface on the terminal;

sending, from the terminal, first information upon detecting an operation for the media object, the first information comprising the media object and a user identifier;

receiving, by the terminal, second information associated with the media object and fourth information associated with third information obtained according to the user identifier, the second information and the fourth information each comprising more than one piece of media information, and the third information comprising at least basic user information, user behavior information, and user relationship chain information, wherein each recommended piece of media information comprised in the second information is determined explicitly according to the first information, the third information associated with the user identifier is determined according to social-interest-based topological relationships, and the fourth information associated with the third information comprises a candidate piece of media information that a friend user from the social-interest-based topological relationships has an interest in, the candidate piece of media information belonging to a same information provider as a recommended piece of media information comprised in the second information, the recommended piece of media information comprised in the second information includes a media object of a product brand, and the candidate piece of media information comprised in the fourth information is a media object of a product belonging to the product brand;

receiving more than one piece of promotion object information corresponding to the more than one piece of media information in the fourth information at a same time of receiving the fourth information, each promotion object information corresponding to one media information in the fourth information, the promotion object information corresponding to the candidate piece of media information comprised in the fourth information includes contact information of a merchant of the product brand;

aggregating and displaying the more than one piece of media information in the second information in a first region on a second interface according to a first aggregation layout; and aggregating and displaying the more than one piece of media information in the fourth information and the more than one piece promotion object information in a second region on the second interface according to a second aggregation layout different from the first aggregation layout, such that instant and accurate recommended content based on the media object is viewable on the first region, and diverse and personalized recommended content based on the user identifier is viewable on the second region, wherein displaying the more than one piece promotion object information comprises: displaying a phone button to initiate a call to the merchant corresponding to a displayed piece of media information according to the contact information of the merchant, wherein a first cost per click (CPC) rate of the media object on the first interface is a sum of prices of the more than one piece of media information displayed on the second interface, and each price of the more than one piece of media information is positively related to a second CPC rate and a click-through rate of the corresponding piece of media information.

17. The non-transitory computer-readable storage medium according to claim 16, wherein the social-interest-based topological relationships are obtained by:

analyzing data about a social relationship chain of each user to construct social topological relationships between the users;

analyzing data about users performing operation on each piece of media information to construct interest-based topological relationships between the media information and the users; and associating the social topological relationships with the interest-based topological relationships to construct the social-interest-based topological relationships.

18. The non-transitory computer-readable storage medium according to claim 16, wherein the computer-executable instructions further cause the one or more processors to perform:

receiving promotion object information corresponding to the media information in the second information and the fourth information at the same time when the second information and the fourth information are received; and displaying the promotion object information corresponding to the media information in the second information and the fourth information at the same time when the second information and the fourth information are aggregated and displayed on the second interface.

19. The non-transitory computer-readable storage medium according to claim 16, wherein the computer-executable instructions further cause the one or more processors to perform:

obtaining, from a media library, the second information associated with the media object on which the operation is performed, wherein all media information comprised in the media library has a display pattern parameter consistent with that of the media object on which the operation is performed; and obtaining, from the media library, the fourth information associated with the third information.

20. The non-transitory computer-readable storage medium according to claim 16, wherein the computer-executable instructions further cause the one or more processors to perform:

sending fifth information from the terminal, the fifth information comprising at least terminal position information and terminal network information;

wherein the second information associated with the media object on which the operation is performed is obtained according to the fifth information; and the fourth information associated with the third information is obtained according to the fifth information.

* * * * *